(12) United States Patent
Fischer et al.

(10) Patent No.: US 9,592,701 B2
(45) Date of Patent: Mar. 14, 2017

(54) SECURITY ELEMENT AND SECURITY DOCUMENT

(71) Applicants: OVD Kinegram AG, Zug (CH); Bundesdruckerei GmbH, Berlin (DE)

(72) Inventors: Jorg Fischer, Berlin (DE); Olga Kulikovska, Berlin (DE); Andre Leopold, Berlin (DE); Sebastian Mader, Lucerne (CH); Wayne Robert Tompkin, Baden (CH); Harald Walter, Horgen (CH)

(73) Assignees: OVD KINEGRAM AG, Zug (CH); BUNDESDRUCKEREI GMBH, Berlin (DE)

( * ) Notice: Subject to any disclaimer, the term of this patent is extended or adjusted under 35 U.S.C. 154(b) by 0 days.

(21) Appl. No.: 14/425,183

(22) PCT Filed: Sep. 3, 2013

(86) PCT No.: PCT/EP2013/068170
§ 371 (c)(1),
(2) Date: Mar. 2, 2015

(87) PCT Pub. No.: WO2014/033318
PCT Pub. Date: Mar. 6, 2014

(65) Prior Publication Data
US 2015/0258835 A1    Sep. 17, 2015

(30) Foreign Application Priority Data

Sep. 3, 2012 (DE) .......... 10 2012 108 170

(51) Int. Cl.
*G06K 9/74* (2006.01)
*B42D 25/29* (2014.01)
(Continued)

(52) U.S. Cl.
CPC .............. *B42D 25/29* (2014.10); *B32B 37/12* (2013.01); *B32B 37/144* (2013.01); *B42D 25/00* (2014.10);
(Continued)

(58) Field of Classification Search
CPC .......... B42D 25/29; B42D 15/00; G03H 1/00; B23K 26/00; G02B 5/18; G02B 5/32;
(Continued)

(56) References Cited

U.S. PATENT DOCUMENTS 3,599,147 A * 8/1971 Rogers ..................... G06K 9/82
356/71
6,545,808 B1 * 4/2003 Ehbets ................. G02B 5/1857
359/15
(Continued)

FOREIGN PATENT DOCUMENTS

CN       101087695     12/2007
DE       102008024147  11/2009
(Continued)

*Primary Examiner* — Tarifur Chowdhury
*Assistant Examiner* — Jamil Ahmed
(74) *Attorney, Agent, or Firm* — Hoffmann & Baron, LLP

(57) ABSTRACT

The invention relates to a security element (2), in particular in the form of a multi-layer flexible film body, with a top side facing an observer and a back side facing away from the observer, as well as a method for the production thereof. The security element (2) has one or more light-emitting elements arranged in a first area (30) of the security element which radiate light when activated and in particular are formed in each case of a self-luminous, electrically operated, display element. The security element (2) has, in the first area (30), one or more transmissive diffraction structures. The one or more transmissive diffraction structures are arranged such that at least a part of the light radiated by the activated one (Continued)

or more light-emitting elements transmits through at least one partial area of the transmissive diffraction structures.

51 Claims, 29 Drawing Sheets

(51) Int. Cl.
| | |
|---|---|
| B42D 25/23 | (2014.01) |
| G02B 5/18 | (2006.01) |
| G02B 27/09 | (2006.01) |
| G02B 27/42 | (2006.01) |
| B42D 25/00 | (2014.01) |
| B42D 25/328 | (2014.01) |
| B32B 37/12 | (2006.01) |
| B32B 37/14 | (2006.01) |

(52) U.S. Cl.
CPC ........... *B42D 25/23* (2014.10); *B42D 25/328* (2014.10); *G02B 5/1866* (2013.01); *G02B 5/1876* (2013.01); *G02B 5/1885* (2013.01); *G02B 27/0944* (2013.01); *G02B 27/4277* (2013.01); *B32B 2037/1253* (2013.01); *B32B 2307/20* (2013.01); *B32B 2307/422* (2013.01); *B32B 2425/00* (2013.01); *B42D 2035/36* (2013.01)

(58) Field of Classification Search
CPC . G02B 27/44; B32B 3/00; G07D 7/00; G06K 9/08; G09G 5/10; G03F 7/20; G01L 51/00

See application file for complete search history.

(56) References Cited

U.S. PATENT DOCUMENTS

| | | | | |
|---|---|---|---|---|
| 2002/0163725 | A1* | 11/2002 | Kobayashi | G02B 5/1814 359/576 |
| 2005/0269303 | A1* | 12/2005 | Lutz | B29C 59/022 219/121.85 |
| 2008/0035736 | A1* | 2/2008 | Tompkin | B42D 25/29 235/488 |
| 2008/0169639 | A1* | 7/2008 | Eichenberger | G07D 7/02 283/85 |
| 2008/0259416 | A1* | 10/2008 | Peters | G02B 5/18 359/2 |
| 2009/0244519 | A1* | 10/2009 | Whiteman | B42D 25/29 356/71 |
| 2009/0289246 | A1* | 11/2009 | Schneider | G03F 1/14 257/40 |
| 2010/0151207 | A1* | 6/2010 | Hansen | B44C 1/16 428/172 |
| 2010/0165425 | A1* | 7/2010 | Tompkin | B44F 1/10 359/2 |
| 2011/0128600 | A1* | 6/2011 | Tompkin | G02B 5/32 359/2 |
| 2012/0139956 | A1* | 6/2012 | Joseph | G09F 9/30 345/690 |
| 2012/0141739 | A1* | 6/2012 | Chevallier | B44C 1/105 428/156 |
| 2012/0187674 | A1 | 7/2012 | Zahedi | |

FOREIGN PATENT DOCUMENTS

| | | |
|---|---|---|
| DE | 102009048870 | 2/2011 |
| EP | 0075674 | 12/1985 |
| WO | WO02091041 | 11/2002 |
| WO | WO2006029857 | 3/2006 |
| WO | WO2006056089 | 6/2006 |
| WO | WO2006061171 | 6/2006 |

* cited by examiner

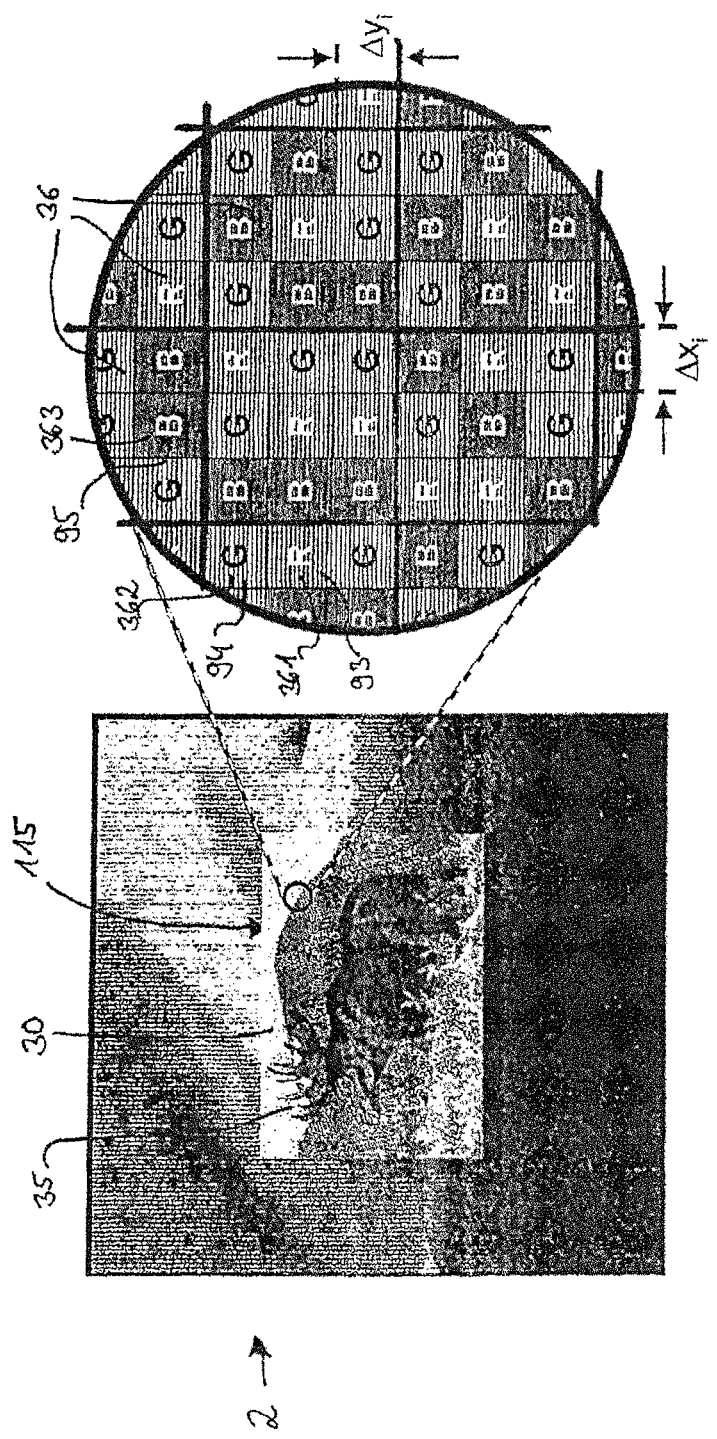

SECURITY ELEMENT AND SECURITY DOCUMENT

This application claims priority based on an International Application filed under the Patent Cooperation Treaty, PCT/EP2013/068170, filed on Sep. 3, 2013, and German Application No. DE 102012108170.0, filed on Sep. 3, 2012.

BACKGROUND OF THE INVENTION

The invention relates to a security element and a security document with a security element.

It is known to equip banknotes with watermarks or security threads. These security elements provide a security feature which is recognizable in transmitted light. For inspection of these security features, the banknote is arranged between a light source, for example an artificial light source such as a neon tube or an incandescent light bulb or a natural light source such as for example the sun, and the observer and the appearance of the banknote is inspected in such a transmitted light observation. With this manner of observation, the light transmitted through the banknote is weakened differently in different areas of the banknote by the change in the transmissivity of the security document in the area covered with the watermark or security thread, with the result that a corresponding contrast becomes recognizable to the human observer as a security feature.

SUMMARY OF THE INVENTION

The object of the invention is now to specify a security element or security document with an increased level of protection against forgery and/or easier verifiability.

This object is achieved by a security element, in particular in the form of a multi-layer flexible film body, which has one or more light-emitting elements, arranged in a first area of the security element, which radiate light when activated and in particular are formed in each case of a self-luminous electrically operated display element, wherein the security element has one or more transmissive diffraction structures, wherein the one or more transmissive diffraction structures are arranged such that at least a part of the light radiated by the activated one or more light-emitting elements transmits through at least one partial area of the transmissive diffraction structure. This object is further achieved by a method for producing a security element, in particular a value document such as a banknote, an ID document or a card, in which method a first partial element is provided which has one or more light-emitting elements which radiate light when activated and in particular are formed in each case of a self-luminous electrically operated display element, in which method a second partial element is provided which has one or more transmissive diffraction structures, and in which method the first partial element and the second partial element are arranged relative to each other such that at least a part of the light radiated by the activated one or more light-emitting elements transmits through at least one partial area of the transmissive diffraction structure.

Such a security element is characterized by a high level of protection against forgery, an easy and quick recognizability of the security feature and by an attractive optical appearance.

The security element preferably has a substrate which is transparent at least in areas and in which the one or more transmissive diffraction structures to be formed. The substrate is preferably arranged above the one or more light-emitting elements.

By a transparent substrate is meant here a single- or multi-layer body which in the first area is transparent, at least in areas, to the light radiated by the one or more light-emitting elements and in particular, at least at one tilt angle, has a transmissivity for at least one wavelength from the wavelength range of from 460 nm to 660 nm of more than 20%, in particular more than 50%. At least at one tilt angle, the transmissivity is preferably more than 50% in the wavelength range of from 460 nm to 660 nm and further preferably more than 80% in at least half of the wavelength range of from 460 nm to 660 nm. The one or more light-emitting elements preferably radiate light of one color, multi-colored light or white light when activated. The light-emitting elements here can be divided into two or more groups of light-emitting elements which realize a true-color image. In particular, such groups of light-emitting elements can be designed as an active matrix (AM) or passive matrix (PM) display. Thus it can be provided that one group of light-emitting elements emits red light when activated, a further group of light-emitting elements emits green light when activated and a further group of light-emitting elements emits blue light when activated, and the corresponding true color of the corresponding true-color image is generated by additive color mixing of the light emitted by light-emitting elements of different groups. In particular in such a design of the light-emitting elements, it is advantageous if the transparent substrate has a transmissivity of more than 20%, in particular of more than 50%, over the whole wavelength range of the light-emitting elements used, and thus has for example the above-named transparency over the whole wavelength range of from 460 nm to 660 nm. If the one or more light-emitting elements only emit light of a limited wavelength range, it is possible for the transparent substrate to have the above-named transmissivity only in this wavelength range, in particular in the wavelength range of a single color.

The transmissive diffraction structures are preferably designed such that they change the colored appearance, the spectral composition, the brightness contrast, the distribution of the angles of radiation and/or the beam formation of one or more of the light-emitting elements when the security element is tilted and/or rotated. For example, zero-order transmitted-light effects can also be combined with first-order or higher-order transmitted-light effects.

One or more of the transmissive diffraction structures are thus designed for example such that, when one or more of the light-emitting elements are activated, the partial areas, of the first area, covered with them which are arranged overlapping with one of the light-emitting elements display, as optical security feature, a color-change effect that is recognizable to the human observer, when the security element is tilted and/or turned.

By transmission through a partial area of the one or more transparent diffraction structures is meant here that the light transmits through at least a part of the areas covered with the one or more transmissive diffraction structures, and thus transmits through at least a part of the transmissive diffraction structures and during the transmission is in particular influenced correspondingly by at least a part of the transmissive diffraction structure.

The security element preferably has a color-neutral and/or contrast-neutral behavior when observed perpendicularly in this partial area and displays one or more of the above-described effects when tilted and/or turned. Alternatively, it is also possible for the reverse effect also to be generated by the one or more transmissive diffraction structures, i.e. for the security element to be color-neutral and/or contrast-neutral in tilted or turned observation and to display one or more of the above-described effects in perpendicular observation.

A further embodiment provides that the transmissive diffraction structures always display one or more of the above-described effects, but the effects in tilted observation or turned observation differ from the effects in perpendicular observation.

The transmissive diffraction structures are preferably selected from one or more of the following classes of transmissive diffraction structures:

A first class of transmissive diffraction structures has, as diffraction structure, a relief structure which is preferably a grating defined by the parameters relief shape, relief depth, grating period and azimuth angle, wherein the relief depth of the relief structure is more than 200 nm, in particular more than 300 nm and further preferably more than 400 nm and/or the relief depth of the relief structure is smaller than 1700 nm, in particular smaller than 1200 nm, preferably smaller than 1000 nm. Further, the relief structure preferably has a grating period between 500 nm and 1500 nm, in particular between 600 and 1400 nm.

The relief structure is preferably a diffraction grating which, in the area of the respective relief structure, is constant in respect of the parameters relief shape, relief depth, grating period and azimuth angle. However, it is also possible for one or more of these parameters to be varied within the area in which the relief structure is provided.

The structure elements of the relief structure can have a sinusoidal, triangular, rectangular, symmetrical or asymmetrical relief shape.

The relief structure here is preferably chosen such that the light transmitted through the relief structure in the zero order in the wavelength range of from 460 to 660 nm or at least in the wavelength range of the light which is radiated by one or more of the light-emitting elements when activated is largely not changed in its color spectrum and the transmittance of the light transmitted in the zero order in the area of the relief structure through the layers of the security element arranged above the one or more light-emitting elements is greater than 30%, in particular greater than 50%.

The relief structure here is preferably molded into a surface of a transparent substrate, in particular molded into the surface of the top side of the security element.

Further, it is alternatively also possible to form the transmissive diffraction structure as a relief structure molded between two transparent layers of the security element. The refractive index of these layers here preferably differs by at least 0.1, and particularly preferably by at least 0.2.

Further, it is advantageous if one of the two transparent layers is a polymer layer, in particular a replication varnish layer, and the other of the two transparent layers is a porous layer, wherein the pores of the porous layer are in particular filled with air. The porous layer can be an open-pored or closed-pored layer. The microporous molding of the layer here makes it possible to provide a layer the refractive index of which is smaller than 1.3 and in particular is close to the refractive index of air.

The layer thickness of the porous layer here is preferably between 2 and 50 μm, preferably between 2 and 20 μm.

According to a further preferred embodiment the two transparent layers are two different layers selected from: polymer layer, in particular replication varnish layer, HRI (HRI=High Refractive Index) or LRI (LRI=Low Refractive Index) layer, which in particular has a layer thickness between 50 and 300 nm, in particular 75 and 150 nm and preferably between 75 and 125 nm, and metallic layer, in particular with a layer thickness in the range of from 2 nm to 20 nm. Layers consisting of a transparent highly refractive material, such as $TiO_2$, ZnS, $ZrO_2$ or $Si_3N_4$, are preferably used as HRI layer. $MgF_2$ or $SiO_2$ are preferably used as low-refractive transparent materials for an LRI layer.

If the relief structure is molded into the surface of the top side of the security element or molded into a boundary surface between a transparent layer and the above-described porous layer, the relief depth is preferably between 900 nm and 1500 nm, further preferably between 900 and 1200 nm. In the other cases, the relief depth is preferably between 300 and 700 nm, further preferably between 400 nm and 700 nm.

The replication varnish layer preferably consists of a thermoplastic or UV-curable varnish layer.

The transmissive diffraction structures of a second class of transmissive diffraction structures are formed as follows: the transmissive diffraction structure is formed of a plurality of elements, wherein the elements in each case have at least one element surface arranged substantially parallel to a base plane, the elements are arranged offset relative to each other in relation to at least one first direction running parallel to the base plane and the element surfaces of neighboring elements are spaced apart in a direction perpendicular to the base plane, according to a variation function dependent on the at least one first direction, by a first distance or a multiple of the first distance. The variation function is preferably a periodic function. Further, in each period of the variation function the element surfaces of at least two elements following on from each other in the at least one first direction are preferably spaced apart from each other by the first distance. The period here is preferably chosen to be smaller than 3 μm, in particular 2 μm, and greater than 750 nm, in particular 1 μm. Each period preferably comprises 3 to 10, in particular 3 to 6 successive elements. The first distance is preferably between 50 and 500 nm, in particular between 100 and 300 nm.

It has been shown that, by means of such structures, a particularly marked change of the color spectrum of the light transmitted through the transmissive diffraction structure can be achieved. The tilt angle range in which a change of the color spectrum is brought about by the transmissive diffraction structure is set here by the period and the variation function. The spectral range in which a change of the color spectrum of the light radiated by one or more of the light-emitting elements is brought about by the transmissive diffraction structure is fixed by the parameters first distance and period.

The security element here can have a transparent layer, in which the elements are embedded. The elements themselves are here formed of a material which differs from the material of the transparent layer, in particular differs in the refractive index by more than 0.1. Further, it is also possible for the elements to be formed of partial areas of a transparent layer of the security element and for the element surfaces to form at least one partial area of a surface of this layer and thus to define a surface relief formed in this layer.

Symmetrical stepped functions which describe for example a sequence of step pyramids are preferably used as variation function. However, it is further also advantageous to use a function that is asymmetrical within a period as variation function.

A third class of transmissive diffraction structures is formed of specific zero-order diffraction gratings defined by the parameters relief shape, relief depth, grating period and azimuth angle. These zero-order diffraction gratings are characterized in that they change, above all, direct transmission, i.e. zero-order transmission. In particular, they change the color spectrum of the directly transmitted light when the security element is tilted and/or turned. These diffraction gratings have, in particular, a relief depth between 100 nm and 500 nm, preferably between 300 nm and 500 nm, and a grating period between 250 nm and 700 nm, preferably between 300 nm and 600 nm. The relief structure of the diffraction grating here is preferably molded between a transparent layer and a transparent waveguide layer, in particular an HRI layer (HRI=High Refractive Index). The thickness of the HRI layer here is typically 50 nm to 250 nm, preferably between 80 and 250 nm, in particular between 100 and 220 nm. This HRI layer is much thicker than the HRI thickness which is typically used for diffraction gratings in reflection. The difference in thickness is approx. a factor of two to three. The HRI layer acts as a waveguide in which the diffraction grating couples light in and out again. The parameters of the diffraction grating and the thickness of the HRI layer, the refractive indices of the various materials and the illumination and azimuth angles determine the resonance condition of the zero-order diffraction grating, and thus the transmitted color spectrum. Zero-order diffraction gratings are sometimes also called resonant gratings or guided-mode resonant filters.

A fourth class of transmissive diffraction structures is formed of diffractive beam-forming structures. These transmissive diffraction structures are preferably formed of a volume hologram, a blaze structure, a diffractive lens or an array of diffractive lenses, in particular a Fresnel lens structure or an array of Fresnel lens structures, or of diffractive structures or an array of diffractive structures which have lens-like beam-forming properties. By an array of structures is meant here a plurality of structures which are arranged according to a one- or two-dimensional grid.

The security element here is preferably designed, in particular by corresponding design of the transmissive diffraction structures as described above, such that the following effect is generated: if the one or more light-emitting elements are not activated, then no motif is recognizable. If the one or more light-emitting elements or some of the light-emitting elements are activated, then the light emitted by them is visible to the human observer in perpendicular observation, wherein the areas covered with the one or more transmissive diffraction structures can optionally have a slightly lower brightness than the surrounding areas. If the security element is tilted out of the perpendicular observation direction by a particular, predetermined angle, then a motif becomes visible, for example a brightly luminous "OK" against a less brightly luminous red background. When the security element is rotated in the plane spanned by the security element, the contrast can then further also change, for example the background can appear brighter than the motif.

Each light-emitting element is preferably assigned one of these transmissive diffraction structures, which modifies the radiation characteristics of the respective light-emitting element. This is particularly advantageous if the light-emitting elements form a pixelated luminous surface and each of these pixels can be regarded as a Lambertian radiator. In this case, the radiation characteristics of individual pixels can be modified by means of assigned transmissive diffraction structures, for which the transmissive diffraction structures are spatially correlated to the pixels.

The first area thus preferably has one or more zones which are preferably arranged according to a one- or two-dimensional grid, wherein one of the light-emitting elements is arranged in each of the zones, and at least one of the transmissive diffraction structures is arranged in each of the zones. The transmissive diffraction structures can thus be distributed in a grid over the surface of a display made of a plurality of light-emitting elements, wherein this grid correlates to the pixel grid of the display. The display can be e.g. an active matrix (AM) or passive matrix (PM) display.

The security element preferably further has a control device which controls the one or more light-emitting elements. The one or more light-emitting elements can thus form for example a single-colored or multi-colored display, for example can form an RGB display. The control device here is preferably designed such that it controls the one or more light-emitting elements to generate one or more different motifs, for example in each case controls several of the one or more light-emitting elements for example to generate a yellow star, a green square or a red circle. The control device here can control the one or more light-emitting elements such that these motifs appear simultaneously or following on from each other. Due to the correlation, as described above, of the grid according to which the light-emitting elements are arranged, or of the pixel grid of the display, to the zones, in particular the transmissive diffraction structures provided in each case in the zone, different ones of the above-described optically variable effects can be provided for different ones of these one or more light-emitting elements.

The transmissive diffraction structures here are preferably formed of simple line gratings. Depending on the alignment of the grating lines of the line gratings, the radiation angle is changed in at least one direction/plane. Depending on the position and angle of the distribution grids of the diffractive areas, different angular distributions of the radiation can be realized. Lens-like effects can be produced here by the variation of the alignment of the grating lines.

One or more of the transmissive diffraction structures arranged in the zones thus preferably comprise a relief structure with a plurality of grating lines arranged substantially parallel to each other, wherein these grating lines are provided in a central area of the respective zone, preferably in a radiation area of the light-emitting element assigned to the zone, and are not provided in an edge area of the zone, in particular in an area of the zone in which the assigned light-emitting element does not radiate light, or vice versa.

The orientation of the grating lines in partial areas of the zones here is preferably chosen to be different and/or chosen to be different from zone to zone.

Interesting lens-like beam-forming effects which cannot be imitated for example by "normal" lenses are generated by such a design and arrangement of the transmissive diffraction structures, whereby additional security features can be provided and/or the recognizability of the security features provided by the security element can be further improved. Furthermore, the beam-forming transmissive diffraction structures have a much smaller depth than "normal" lenses with refractive action or also microlenses with refractive action, which is why they can be integrated more easily into security documents.

According to a further preferred embodiment example one or more transmissive diffraction structures arranged in the zones are molded as relief structures of a diffractive lens, in particular a Fresnel lens, or a circular grating. It is hereby possible to change the radiation characteristics of the light-emitting elements and to optimize them in particular for further transmissive diffraction structures arranged above these transmissive diffraction structures.

According to a preferred embodiment example transmissive diffraction structures are arranged not only next to each other, but lying one above another, in relation to a direction perpendicular to the plane spanned by the back side of the security element. It is particularly advantageous here if beam-forming diffraction structures, in particular transmissive diffraction structures of the above-described fourth class of diffraction structures, and effect-generating transmissive diffraction structures, in particular diffraction structures of the first, second and/or third class of diffraction structures, are arranged lying one above another, in relation to a direction perpendicular to the plane spanned by the back side of the security element.

In the above-described embodiments the advantage is achieved here in particular that the level of protection against forgery of the security element is significantly increased. It is thus necessary for example to match the spacing and arrangement of the light-emitting elements and the optical characteristics and arrangement of the one or more transmissive diffraction structures correspondingly to each other, in order to achieve the desired optical effect. Even in the case of small deviations, a significantly deviating observed impression can arise for the human observer here, with the result that forgery attempts become immediately recognizable.

According to a preferred embodiment example of the invention one or more pattern areas forming one or more motifs are covered in particular over the whole surface with one or more of the transmissive diffraction structures. Further, a background area preferably surrounding the one or more pattern areas is not covered with the one or more transmissive diffraction structures. One or more of the one or more light-emitting elements are provided both in the background area and in the pattern area. The transmissive diffraction structures thus preferably cover only one patterned partial area, molded in the form of one or more motifs, of the area illuminated by the one or more light-emitting elements. In a first observation situation, only the surface molding and/or coloring of these illuminated surfaces is thus visible to the observer as a security feature. If the observer tilts or turns the security element, a contrast between background areas and pattern areas becomes visible.

The one or more transmissive diffraction structures are preferably designed such that, when the one or more light-emitting elements are deactivated, this effect is not generated, and in particular an inverse effect is generated, i.e. for example the pattern areas, and thus the one or more motifs, are recognizable when observed perpendicularly and the pattern areas, and thus the one or more motifs, are no longer visible when tilted or turned.

According to a further preferred embodiment example of the invention two or more different transmissive diffraction structures are arranged in the first area.

These different transmissive diffraction structures are here preferably designed such that they display different color-change and/or brightness-change effects when the security element is tilted and/or turned, in particular differ in relation to the tilt angle at which a color is generated, or in relation to the color value which is generated at a particular tilt angle. It is also particularly advantageous here to provide several light-emitting elements which can be used to generate different images. It is thus possible for example to use light-emitting elements which radiate light of different base colors when activated, for example to provide elements emitting red, green and blue light. For example, the effect can then hereby be generated that three different images are visible at three different angles, and similar effects.

Through the use of two or more different transmissive diffraction structures, in particular also in combination with an overlapping arrangement, over the whole surface or in areas, of one or more of the light-emitting elements, a plurality of striking and surprising security features can be realized, as also described in the following.

According to a preferred embodiment example of the invention, the first area has one or more first zones which are covered with a first of the transmissive diffraction structures, and one or more second zones which are covered with a second of the transmissive diffraction structures. The first transmissive diffraction structures differ here from the second transmissive diffraction structures. The first zone or the first zones here are covered with the first diffraction structure in each case preferably over the whole surface. The second zone or the second zones here are covered with the second transmissive diffraction structure in each case preferably over the whole surface.

Further, it is also possible for the first area to have, in addition to the one or more first and second zones, still further zones which are covered with others of the one or more transmissive diffraction structures which differ from the first and second diffraction structures. The first area thus preferably also has one or more third zones and/or one or more fourth zones, wherein the third zones are covered with a third one of the one or more transmissive diffraction structures or, respectively, the fourth zones are covered with a fourth one of the one or more transmissive diffraction structures. The first, second, third and optionally fourth transmissive diffraction structures here in each case mutually differ from each other.

The first and the second transmissive diffraction structures preferably differ from each other by one or more of their structure parameters and/or by their composition. It has proved worthwhile here for the first and second diffraction structures to differ from each other for example in their relief shape, their azimuth angle and/or their grating period. By relief shape is meant here the shaping of the structure elements of which the transmissive diffraction structure is formed. Here, the first and second transmissive diffraction structures can have for example different symmetrical relief shapes, for example the first diffraction structure can have a sinusoidal relief shape and the second transmissive diffraction structure can have a rectangular relief shape. Further, it is also possible for the first diffraction structure to have an asymmetrical relief shape and for the second diffraction structure to have a symmetrical relief shape, or vice versa, or for the first or second diffraction structure to differ in relation to the asymmetry of the relief shape.

Further, it is advantageous if the first and second transmissive diffraction structures are formed of different types of transmissive diffraction structures. By different types of transmissive diffraction structures here is meant diffraction structures which have a different layer composition and/or which are selected from different ones of the classes of transmissive diffraction structures described above, for example a combination of the first class of transmissive diffraction structures described above and the second, third or fourth class of transmissive diffraction structures described above.

Further, it is advantageous if the first and the second transmissive diffraction structures differ in the effects that are recognizable to the human observer when the one or more light-emitting elements are activated, and differ in particular in one or more of the following parameters: change of the color spectrum of the transmitted light in an untilted state, change of the color spectrum of the transmitted light in a tilted state, tilt angle or tilt angle range in which the color spectrum is changed, transmissivity in an untilted state, transmissivity in a tilted state, alignment of the tilt axis to achieve these effects. It is hereby possible to generate interesting optically variable effects: thus, for example, an image which is correlated to an arrangement of activated light-emitting elements first appears to the observer. Further, bright and optionally moving images appear at a different observation angle, which images further change when the observation angle or the observation conditions is/are changed.

The one or more first and one or more second zones here can be arranged spaced apart from each other or next to each other in the first area of the security element.

With respect to the arrangement of the first area, the partial areas of the first area and the zones, an observation of the security element in top view is taken as the starting point here.

It has proved worthwhile for neighboring first and second zones to be spaced apart from each other by less than 10 µm, preferably less than 1 µm.

According to a preferred embodiment example of the invention the first and second zones in each case have lateral dimensions of more than 300 µm. The first and the second zones preferably have a width and a length of, in each case, more than 500 µm, preferably of more than 2000 µm. In this embodiment the first and second zones thus preferably have lateral dimensions in which the shaping of the first and second zones can be resolved by the human observer at a normal observation distance.

By lateral dimension is meant here the dimensions in a top view of the security element, i.e. the dimensions in the plane spanned by the top side or bottom side of the security element. By lateral dimension is thus meant in particular the width and the length of the zones.

The one or more first zones are preferably molded to form a first motif and the one or more second zones to form a second motif. By motif is meant here, among other things, also letters and numbers, a sequence of letters and numbers, logos, figurative representations, for example the portrait of a person, symbols or the like.

Through such a design it is thus possible for example to provide a security feature which displays for example the first motif in a first tilt angle range when the one or more light-emitting elements are activated and the second motif in a second tilt angle range different from this when the one or more light-emitting elements are activated, or displays the first and second motifs in different colors.

Further, it is advantageous if the one or more first and second zones are molded to form one common motif, wherein the first zones form a foreground area of the motif and the second zones form a background area of the motif. At least one or more of the first zones here are preferably completely surrounded by one of the second zones. Through such a design for example security features can be provided in which the motif only appears in a particular tilt angle range, in particular also in combination with an overlapping arrangement, over the whole surface or in areas, of one or more of the light-emitting elements, because of a contrasting color of foreground area and background area or the color of the foreground area or background area changes depending on the tilt angle. Further, a change of the contrast can correspondingly also be brought about. Thus, for example, a bright image appears at one or more observation angles and the brightness of the image varies with the change of the observation angle.

According to a further preferred embodiment example of the invention a plurality of second zones are provided in the first area, wherein the first and second zones in each case have at least one lateral dimension of less than 300 µm, in particular less than 150 µm and preferably less than 80 µm. The first and second zones here can be formed for example in the form of grids or pixels, for example in the shape of a square, an octagon, a polygon, in particular a trapezium, or the like with a width and length dimension of less than 300 µm or can also be formed in the form of stripes, with a width of less than 300 µm and a length of more than 300 µm. The first and second zones here in each case preferably have a width of more than 5 µm, in particular 10 µm, further preferably of more than 20 µm.

As already stated above, in addition to the first and second zones, in the first area, still further zones can be provided which are covered with a transmissive diffraction structure which differs from the first and second transmissive diffraction structures. The first area thus preferably has third and/or fourth zones which are covered with third or, respectively, fourth transmissive diffraction structures, wherein the third and fourth zones in each case also have at least one lateral dimension of less than 300 µm, in particular less than 150 µm, preferably less than 80 µm.

The use and the arrangement of such first, second, third and/or fourth zones make it possible to generate numerous optical security features which clearly improve the level of protection against forgery of the security element.

According to a preferred embodiment example of the invention, by means of such zones, in particular also in combination with an overlapping arrangement, over the whole surface or in areas, of one or more of the light-emitting elements, true-color images are generated which can change their color and their visibility further, among other things, when tilted.

For this, the first area preferably has a motif area which is divided into a plurality of image point areas. Image point areas here can have not only a square, rhombic or octagonal shaping, but also a rectangular shaping. Here, at least two different zones selected from the group first and second zones, the group first, second and third zones, or the group first, second, third and fourth zones are arranged in at least a first of the image point areas. Thus, if for example three different zones are provided, the first image point area has for example one or more first and second zones, one or more second and third zones, or one or more first, second and third zones. Further, these zones are arranged in the first image point area such that the color appearing in the first image point area when the one or more light-emitting elements are activated at least at one tilt angle is generated by additive color mixing of the colors generated at this tilt angle by those of the transmissive diffraction structures that are arranged in this image point area in the different zones when the one or more light-emitting elements are activated.

The first image point area here preferably has at least one lateral dimension of less than 300 µm.

The brightness and the color value of the color generated, in the case of the one or more light-emitting elements in the first image point area, by the transmissive diffraction structures arranged there is determined here by the size of the surface area of the first, second and optionally third and fourth zones arranged in the first image point area, as well as the colors generated at this tilt angle by the first, second and optionally third and fourth transmissive diffraction structures. Corresponding choice of the size of the surface area of the first, second and optionally third and fourth zones in the first image point area, and the color of the light-emitting elements arranged there, thus makes it possible to set the color generated at the tilt angle when the one or more light-emitting elements are activated in the first image point area.

At least 10%, preferably at least 50% of the image point areas are preferably formed as first image point areas. One or more of the image point areas are further preferably formed as second image point areas in which, in each case, only one type of zones is provided, thus for example only one or more first zones or one or more second zones are provided.

According to a further preferred embodiment example of the invention a first motif area molded in the form of a first motif and a second motif area molded in the form of a second motif are provided in the first area. The first motif area and the second motif area overlap here at least in areas. Further, the first motif area is divided into a plurality of partial areas which in each case are covered with one or more first zones, and the second motif area is divided into a plurality of partial areas which in each case are covered with one or more second zones. The partial areas here preferably have at least one lateral dimension of less than 300 μm. In the overlap area of the first or second motif area, first and second zones are thus provided, in particular are provided neighboring each other, and in particular are arranged gridded in each other. Further, it is advantageous here if the first and second zones in each case are arranged according to a one- or two-dimensional grid and, in particular in the overlap area, areas of the grid which are assigned to first zones and areas of the grid which are assigned to second zones alternate. The grid width of the grid is preferably less than 300 μm in at least one direction.

This procedure makes it possible to provide a security feature which, when the one or more light-emitting elements are activated, displays the first motif in a first tilt angle range and the second motif in a second tilt angle range, and optionally a superimposed representation of the first and second motifs in a third tilt angle range. The first area here preferably has not only a first motif area and a second motif area, but a plurality of motif areas which in each case are covered with different zones. Interesting optical effects, such as for example a simulation of a movement effect or a transformation effect, in which for example a first motif transitions via one or more intermediate steps into a second motif, can hereby be generated when the one or more light-emitting elements are activated.

In this embodiment example, as already described above, the first zones and the second zones are preferably covered with different types of transmissive diffraction structures. For example the optical appearance of one of the motifs can hereby be changed depending on the use of a polarizer when the one or more light-emitting elements are activated, with the result that for example the first motif, but not the second motif changes when a polarizer is used.

According to a further preferred embodiment example it is also possible for one or more of the light-emitting elements to radiate polarized light when activated. Thus it is possible for example for one or more of the light-emitting elements to be formed as LCD display elements.

According to a further preferred embodiment example of the invention it is also possible for one or more polarizing elements to be provided in the security element, which polarizing elements are arranged between one or more of the light-emitting elements and one or more of the transmissive diffraction structures.

Through such a design, stronger color effects, stronger contrasts and further also security features which can be made visible only by means of an aid (polarizer) can be provided.

Each light-emitting element preferably has a radiation area in which light is radiated in the direction of the top side of the security element when the light-emitting element is activated. One or more of the transmissive diffraction structures preferably overlap the radiation area of one or more of the light-emitting elements over the whole surface, when observed perpendicular to a plane spanned by the back side of the security element. It is also advantageous here if the surface covered by the transmissive diffraction structures is larger than the surface covered by the one or more light-emitting elements.

Further, it is also advantageous if one or more of the transmissive diffraction structures overlap the radiation area of one or more of the light-emitting elements only in areas and in a pattern, when observed perpendicular to a plane spanned by the back side of the security element. It is particularly advantageous here if the surface covered by the one or more transmissive diffraction structures only covers a part of the surface illuminated by the one or more light-emitting elements, as already stated above.

According to a preferred embodiment example of the invention a first item of optical information is provided by the one or more transmissive diffraction structures, in particular in the form of a motif becoming visible, moving or changing its shape or color when tilted or turned. Further, the radiation area of one or more of the light-emitting elements has a patterned shaping and is molded in the form of a motif that is visible as second item of optical information when the light-emitting element is activated. Alternatively or in addition to this, two or more of the light-emitting elements are arranged or controllable such that a motif is visible as second item of optical information when they are activated. The first item of optical information and the second item of optical information are arranged overlapping in areas or completely or also next to each other, relative to a perpendicular to a plane spanned by the back side of the security element. When the one or more light-emitting elements are activated, the first and second items of optical information can thus be made visible or changed, whereby complex and striking security features can be provided.

The one or more light-emitting elements are preferably selected from: LED (LED=light emitting diode), OLED (OLED=organic light emitting diode), LEEC (LEEC=light emitting electrochemical cell), QLED (QLED=quantum dot light emitting device), electroluminescent element, backlit LCD (LCD=liquid crystal display), display pixel, segment display, self-luminous active or passive matrix display.

The light-emitting elements (including any carrier substrate) are preferably flexible and thin, e.g. thinner than 1 mm, in particular thinner than 500 μm and preferably thinner than 100 μm.

As already stated above, the one or more light-emitting elements can be provided in the form of a single area, in the form of several larger segments or in the form of pixels. The one or more light-emitting elements here can in each case radiate a single color, several colors or a true color, for example by means of color mixing, when activated.

There are various possibilities for supplying light-emitting elements with energy so that they light up. In an embodiment the light-emitting elements are stimulated to light up with electrical energy from an energy source. As preferred energy sources for the luminescent layer there may be mentioned in particular piezoelectric and photovoltaic power sources, batteries, capacitors, supercapacitors, etc. The energy can also be taken from an electric field via a suitable antenna, e.g. an RFID antenna. These energy sources are preferably integrated into the security element or the security document or connected to it via an energy line. Alternatively, the energy source can also be arranged outside the security element/document, e.g. in an external reader. A galvanic, capacitive or inductive mode of transmitting electrical energy can be selected in the case of an electrical energy source. In the case of an external energy source, the security document can be introduced for example into a corresponding local electric or magnetic or electromagnetic field, in order thus to make a capacitive and/or inductive, in particular wireless, energy transmission possible.

In particular, ID cards and passports often already have RFID antennas via which electronic chips are supplied with energy and read. These RFID antennas are very suitable for providing the electrical voltage and power needed for self-luminous displays. For example, so-called NFC emitters (NFC=near field communication), e.g. NFC antennas in mobile telephones, are suitable as external energy source.

According to a preferred embodiment example the security element has one or more of the following components: a control circuit for controlling the one or more light-emitting elements, a logic circuit, a driver circuit, contact elements, an antenna, in particular for energy supply or for communication, a power supply device.

If the security element has a plurality of light-emitting elements, it is further advantageous if light-blocking structures, in particular vertical light-blocking structures, are arranged in the boundary area between light-emitting elements. The radiation characteristics of the light-emitting elements can hereby be even better matched to the transmissive diffraction structures.

It is possible for all of the light-emitting elements to radiate light of the same color when activated. Further, it is also possible for two or more of the light-emitting elements to radiate light of different colors. It is thus possible for example for one or more first light-emitting elements to radiate red light when activated, for one or more second light-emitting elements to radiate green light when activated and/or for one or more third light-emitting elements to radiate blue light when activated. The light-emitting elements here can radiate light with a narrow frequency spectrum when activated, for example with a frequency spectrum having a peak in the region of 550 nm and a half-width of 20 nm, or also can radiate wide-band light, for example white light.

According to a further preferred embodiment example of the invention the substrate has, in the first area, one or more reflective diffraction structures which display one or more optical security features when observed in reflected light.

A plurality of first partial areas which are covered with one of the one or more transmissive diffraction structures and a plurality of second partial areas which are covered with one of the one or more reflective diffraction structures are preferably provided in the first area.

The first and second partial areas in each case preferably have at least one lateral dimension of less than 300 µm, in particular less than 150 µm, preferably of less than 80 µm. Further, at least in areas, first and second partial areas are arranged next to each other, with the result that in the first area a second item of optical information determined by the second partial areas appears when observed in reflected light and, overlapping this at least in areas, a first item of optical information determined by the first partial areas.

The security element is preferably formed of a laminating film, a transfer layer of a transfer film, a security thread or a label. However, it is also possible for the security element to be formed as a security document or value document, for example as a passport or ID card.

Further, it is also possible, in order to produce a security element according to the invention, for two partial elements to be manufactured first, wherein the first partial element has the one or more transmissive diffraction structures and the second partial element has the one or more light-emitting elements. For example, a first laminating film or transfer film is thus manufactured which has the one or more transmissive diffraction structures and a second film is manufactured which has the one or more light-emitting elements and optionally also—as described above—further electrical components. The first and second partial elements are then connected to each other, e.g. laminated together, in order to produce a security element according to the invention or security document according to the invention.

The security element preferably consists of a flexible film body with a layer thickness between 5 µm and 500 µm, further preferably between 5 µm and 100 µm.

BRIEF DESCRIPTION OF THE DRAWINGS

The invention is explained by way of example below with reference to several embodiment examples with the aid of the attached drawings.

FIG. 1b shows a schematic sectional representation of the security document according to FIG. 1a.

FIG. 8b shows an enlarged representation of a section of the security element according to FIG. 8a.

FIG. 9b shows an enlarged representation of a section of the security element according to FIG. 9a.

FIG. 11a and FIG. 11b show schematic sectional representations of a section of a security element.

FIG. 17b shows a schematic top view of a motif area of the security element according to FIG. 17a.

FIG. 18b shows a schematic top view of a motif area of the security element according to FIG. 18a.

FIG. 18c shows a schematic top view of two overlapping motif areas of the security element according to FIG. 18a.

DETAILED DESCRIPTION OF THE INVENTION

Figure 1A:
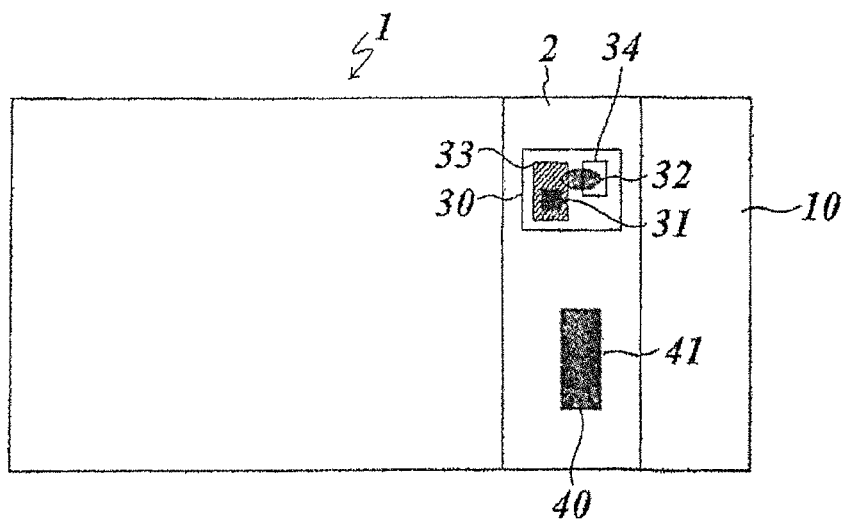
FIG. 1a shows a schematic top view of a security document.
Figure 1B:
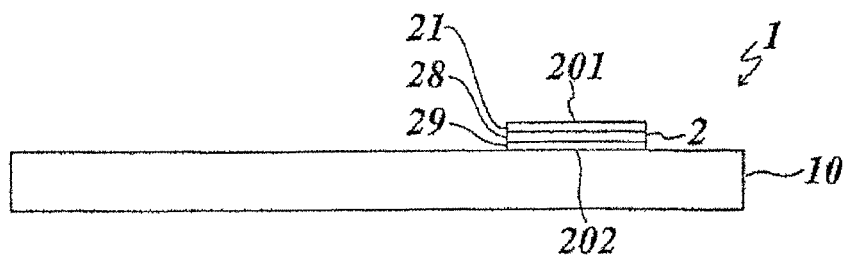

FIG. 1a and FIG. 1b show a security document 1 with a carrier substrate 10 and a security element 2 applied to the carrier substrate 10.

The security document 1 is preferably a banknote, an ID document such as for example a passport, a card, for example an ID card, a bank card, an access card, a credit card and the like, a stock certificate, a security label for product protection or a software certificate.

The carrier substrate 10 preferably consists of a paper substrate, further preferably of a security paper. However, it is also possible for the carrier substrate 10 to consist of a plastic material or for it to be a multi-layer substrate here which comprises one or more plastic and/or paper layers. Further, it is possible for the carrier substrate 10 to be provided with one or more print layers, for example a security imprint, or security elements, for example a watermark, a security thread or an imprint consisting of an optically variable printing material.

The security element 2 is applied to one side of the carrier substrate 10. The security element 2 has a front side 201 facing the observer and a back side 202 facing the carrier substrate 10.

The security element 2 is preferably the transfer layer of a transfer film, or a laminating film which is applied to a side of the carrier substrate 10 by means of an adhesive layer. In the embodiment example according to FIG. 1a and FIG. 1b the security element 2 is shaped in the form of stripes and extends over the whole width of the security document 1 between two opposite edges of the carrier substrate 10. However, it is also possible for the security element 2 to have another shaping, for example a shaping in the form of patches.

Further, it is also possible for the security element 2 not to be applied to a side of the carrier substrate 10, but to be embedded in the carrier substrate 10, for example to be embedded between two layers of the carrier substrate 10.

The security element 2 preferably consists of a flexible, multi-layer film element with a layer thickness between 5 µm and 500 µm, further preferably between 5 µm and 100 µm. The security element 2 has an area 30 in which one or more transmissive diffraction structures and one or more light-emitting elements are provided in the security element 2.

The light-emitting elements can alternatively also be embedded or contained in the security document 1. In this case, no light-emitting elements are provided in the security element 2. The security element 2 here is applied to the light-emitting elements contained in the security document 1, with the result that the security element 2 and the layer or layers of the security document 1 containing the light-emitting elements form, or the security document 1 forms, a security element according to the invention.

The area 30 thus has one or more partial areas, for example the partial areas 31 and 32 shown in FIG. 1a, which are preferably covered over the whole surface with one or more of the light-emitting elements. Further, the area 30 has one or more partial areas, for example the zones 33 and 34, which are preferably covered over the whole surface with one or more of the transmissive diffraction structures. It is also possible here for the area 30 to be covered over the whole surface with the one or more light-emitting elements and/or the one or more transmissive diffraction structures.

The area 30 and the partial areas 31 and 32 and the zones 33 and 34 here, as can be seen from FIG. 1a, are to be understood as an area or partial areas which arise when the top side 201 of the security element 2 is observed in top view, i.e. arise when observed perpendicular to a plane spanned by the back side 202 and/or the front side 201 of the security element 2.

The partial areas 31 and 32 on the one hand and the zones 33 and 34 on the other hand overlap, as shown in FIG. 1a, at least in areas, when observed perpendicular to a plane spanned by the back side of the security element 2. The one or more light-emitting elements radiate light when activated and are preferably formed of self-luminous electrically operated display elements, as stated below. The one or more transmissive diffraction structures are arranged in the security element 30 in relation to the one or more light-emitting elements such that at least a part of the light radiated by the activated one or more light-emitting elements transmits through at least one partial area of the transmissive diffraction structures.

The light-emitting elements are preferably elements which convert electrical power into light and, when activated, i.e. supplied with power, radiate light from a wavelength range of from 380 nm to 780 nm, further preferably from 460 nm to 660 nm. The light-emitting elements here can emit light from a narrow-band wavelength range, for example with a peak at 550 nm and a half-width of 20 nm, or have a wide-band wave spectrum, for example emit white light. If the light-emitting elements form an RGB display, a plurality of light-emitting elements are preferably used which are selected from the group of light-emitting elements radiating red light, radiating green light and radiating blue light. The light-emitting elements preferably have a peak in the region of the wavelength 460 nm, 550 nm and 630 nm respectively and preferably further emit light in a relatively narrow-band wave spectrum around this central wavelength.

The light-emitting element or the light-emitting elements is or are for example an LED, OLED, LEEC, QLED, backlit LCD, electroluminescent element, display pixel, segment display, active or passive matrix display. It is also possible here for different ones of these light-emitting elements to be arranged in the partial areas 31 and 32. Further, the light-emitting elements are preferably arranged in the partial areas 31 and 32 such that, in respect of the resolution of the human eye, light is radiated in the direction of the front side 201 of the security element 2 in the whole partial area 31 or 32 when the light-emitting elements are activated. Further, it is also possible for a light-emitting element which has the molding of the partial areas 31 or 32 respectively to be provided in each of the partial areas 31 and 32. Thus, a corresponding electroluminescent element with a corresponding molding of one or more of the electrodes is provided there for example.

The light-emitting elements could radiate light of the same color when activated. Further, it is also possible for the light-emitting elements to radiate light of different colors, and thus, for example, in the partial area 31 for the one or more light-emitting elements arranged there to radiate light of a first color when activated and for the one or more light-emitting elements arranged in the partial area 32 to radiate light of a second color different therefrom.

The transmissive diffraction structures provided in the zones 33 and 34 are, as also explained in detail further below, designed such that they change the colored appearance, the spectral composition, the brightness contrast, the distribution of the radiation angles and/or the beam formation of the light radiated by one or more of the light-emitting elements when the security element 2 is tilted and/or turned.

One or more of the transmissive diffraction structures here are arranged such that they overlap the radiation area of one or more of the light-emitting elements over the whole surface or only in areas and patterned, when observed perpendicular to a plane spanned by the back side 202 of the security element, as shown for example in FIG. 1a in respect of the partial areas 31 and 32 as well as zones 33 and 34. When the light-emitting elements are activated, a striking optical impression that changes when the security element is tilted, turned and/or rotated thus appears as an optical security element.

Further, it is also possible for a first item of optical information, in particular a motif that becomes visible, moves or changes its shaping or color when tilted or turned, to be provided by the one or more transmissive diffraction structures, as explained in detail further below. Further, a second item of optical information is provided in that the radiation area of one or more of the light-emitting elements has a patterned shaping and is molded in the form of a motif that is visible as second item of optical information when the light-emitting element is activated and/or in that two or more light-emitting elements are arranged and controllable such that, when they are activated, a motif becomes visible as second item of optical information. The second item of optical information can thus be provided for example by a corresponding design of the partial areas 31 and 32. The first and second items of optical information overlap in areas or completely due to the arrangement of the partial areas as described above, or are also arranged at least partially next to each other, relative to a direction perpendicular to a plane spanned back side of the security element. Further complex security features can hereby be provided in the area 30 of the security element 2.

The security element 2—as already stated above—is preferably formed of a laminating film or transfer film and has a layer 21 comprising a substrate with the transparent diffraction structures, optionally a layer 28 arranged under this layer, with the one or more light-emitting elements, as well as an adhesive layer 29, by means of which the security element 2 is fixed to the carrier substrate 10 of the security document 1. In addition to these layers, the security element 21 can comprise still further decorative and/or functional layers, for example also additional carrier, adhesion, detachment layers or one or more further decoration layers.

The area 30 here can, as shown for example in FIG. 1a, extend only over a partial area of the security element 2. However, it is also possible for the area 30 to extend over the whole security element 2.

Further, the security element 2 preferably also has at least one area 40 in which one or more diffraction structures 41 acting in reflection are provided.

Figure 1C:
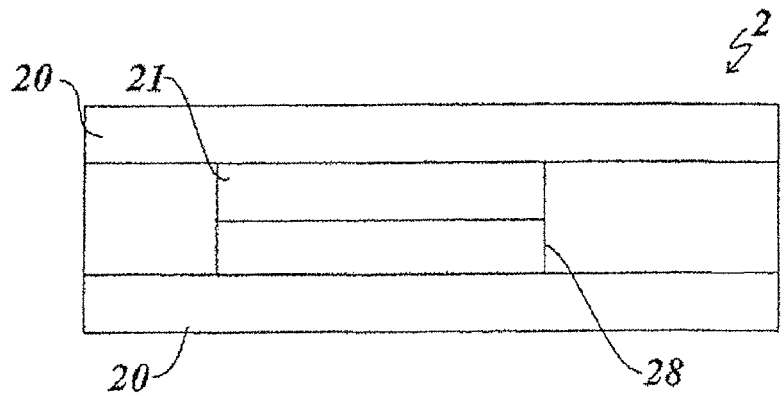
FIG. 1c shows a schematic sectional representation of a security element.

Further, it is also possible for the security element 2—as shown in FIG. 1c—as such to already form for example an ID document, a means of payment, a label for product protection, a security label or the like. Thus, for example, FIG. 1c shows the sectional representation of an ID card with the layers 21 and 28 as well as a lower and an upper cover layer 20. If the security element 2 is formed as a PCI card, an adhesive layer which has the transparent diffraction structures can here be provided above or below the layer 21 (PCI=Polycarbonate Inlay).

Figure 2:
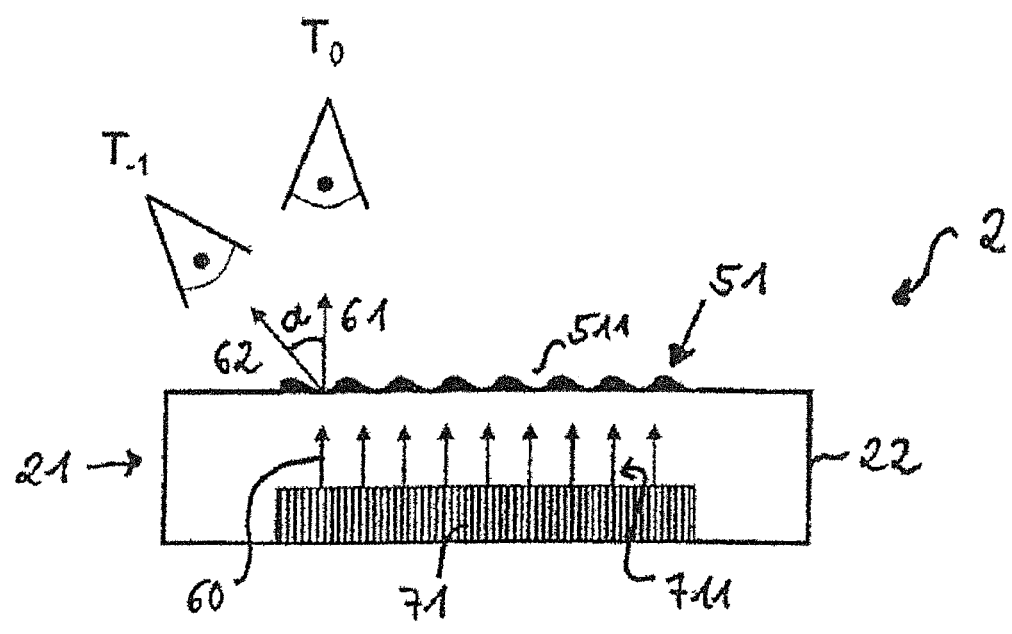
FIG. 2 shows a schematic sectional representation of a security element.

FIG. 2 shows the security element 2 with the substrate 21. The substrate 21 has one or more transparent layers 22 as well as a transmissive diffraction structure 51. The transmissive diffraction structure 51 is formed of a relief structure 511 molded in a surface of the substrate 21. The relief structure 511 here is in particular molded into the surface of the security element 2 facing the observer. The relief structures 511 clearly differ from diffractive structures which are used for observation in reflection, as described in the following.

The relief shape of the relief structure 511 can be sinusoidal, rectangular, symmetrical or asymmetrical, triangular or even more complex. The diffraction is based on the difference in refractive index between air (n=1) and the material of the transparent layer 22, i.e. approximately n=1.5 if a polymer material is chosen. The layer 22 thus consists for example of a thermoplastic or UV-curable transparent plastic material, in the surface of which, by means of a replicating tool, the relief structure 511 is molded using heat and pressure in the case of a thermoplastic material, or is molded and UV-cured in the case of a UV-curable plastic material.

In a further embodiment not shown here the thus-formed surface grating is also additionally coated with a porous, air-filled layer. This layer has a refractive index close to 1.0. In order that this porous layer is transparent, the pores and/or aggregates which form the pores must be smaller than the wavelength of visible light. Such porous layers preferably have a refractive index smaller than 1.3 and in particular smaller than 1.2. The layer thickness of the porous layer is preferably chosen to be in the range of from 2 µm to 50 µm, in particular between 2 µm and 20 µm.

Through this porous layer, the advantage is achieved that the relief structure 511 is protected, without destroying the diffraction properties of this layer.

Further, it is also possible to coat this porous layer with one or more further polymer layers, in order thus to achieve for example a sealing of the surface.

Furthermore, the security element 2 has one or more light-emitting elements, of which one light-emitting element 71 is shown in FIG. 2, which radiates light 60 in a radiation area 711 when the light-emitting element 71 is activated.

When the light-emitting element is activated, the light 60 radiated by the light-emitting element 71 transmits through the transmissive diffraction structure 51, is changed here as described in the following, and then strikes the eye of the observer positioned on the front side of the security element 2.

Figure 3A:
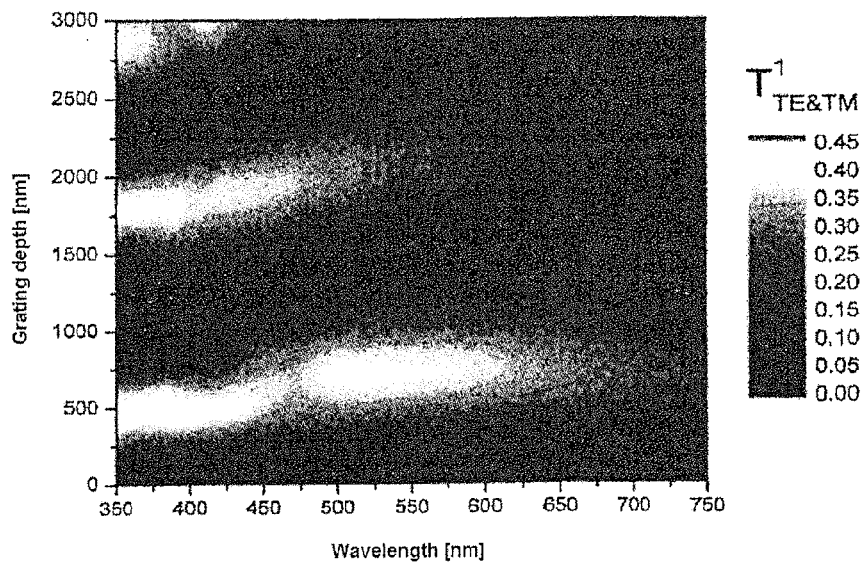
FIG. 3a to FIG. 3c show several diagrams.
Figure 3B:
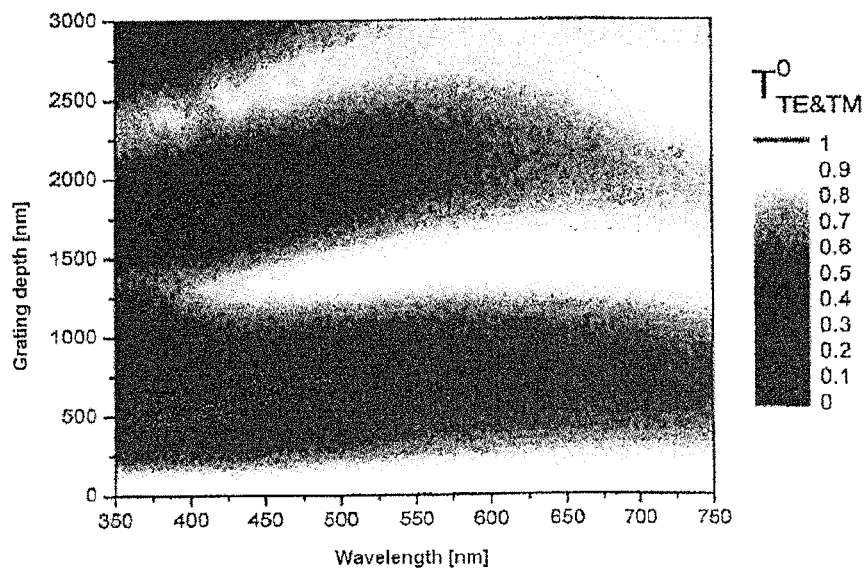

The diffraction efficiency in the zero ($T_0$; light 61) and in the first ($T_{-1}$; light 62) order very markedly depends, among other things, on the relief depth t of the relief structure 511. FIG. 3a shows the diffraction efficiency in the $-1^{st}$ order as a function of the wavelength and the relief depth. The diffraction efficiency lies between 45% (bright) and 0% (dark). The relief structure 511 in this example is a relief structure with a grating period of 770 nm, and a sinusoidal relief shape. Further, FIG. 3a shows the diffraction efficiency averaged over the TE and TM polarization. The illumination angle is chosen to be perpendicular to the plane spanned by the back side of the security element 2, as represented in FIG. 2 correspondingly for the light incidence of the light 60. FIG. 3b shows a corresponding diagram for the zero-order diffraction. The diffraction efficiency here lies between 100% (bright) and 0% (dark).

According to a preferred embodiment of the invention the transmissive diffraction structure 51 is now designed such that the relief structure 511, in addition to as strong as possible a first-order diffraction efficiency, has as uniform, i.e. color-neutral, as possible a zero-order transmission and the color spectrum of the transmitted light changes as little as possible there. The zero-order transmission here is preferably chosen to be greater than 30%, in particular greater than 50%, for the visible spectral range. Here, the range between 460 nm and 660 nm is preferably chosen as visible spectral range.

The investigations carried out thus reveal that the grating depth is to be chosen to be greater than 200 nm, in particular greater than 300 nm and further preferably greater than 400 nm.

To achieve the above-described effect, in which the light transmitted through the diffraction structure 51 in the beam direction perpendicular to the plane spanned by the back side of the security element 2 is transmitted in the direction of the beam direction through the substrate largely unchanged in its color spectrum, the relief depth of the relief structure 511 is preferably between 900 nm and 1700 nm, further preferably between 900 nm and 1500 nm and further preferably between 900 nm and 1200 nm.

An important relief parameter of the relief structure 511 is the grating period. As already known of reflection gratings, the diffracted wavelength shifts towards larger wavelengths when the grating period increases. This also applies to transmissive diffraction structures. It has been shown that, if the relief depth lies in the previously defined range, a broader range of grating periods can be used in order to set hereby a tilt angle range in which a color-change effect appears as an optical security feature.

The grating period of the relief structure 511 here preferably lies in the range of from 500 nm to 1500 nm, further preferably between 600 nm and 1400 nm.

Figure 3C:
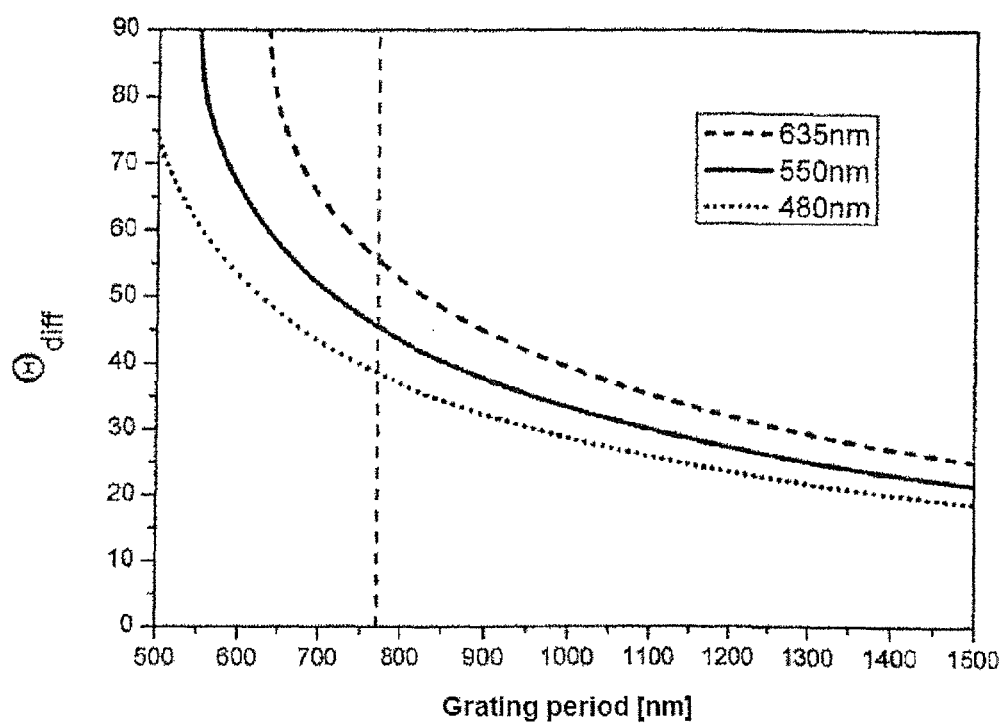

FIG. 3c here illustrates the dependency between this tilt angle or observation angle α or β respectively and the grating period for the example wavelengths 480 nm (blue), 550 nm (green) and 635 nm (red). The diagram here was determined for a relief structure with a sinusoidal relief profile and the observation situation according to FIG. 2.

Through corresponding choice of the grating period, the color appearing in the partial areas of the area 30 covered with the relief structure 511 when tilted or when the observation angle is changed and the tilt angle range or observation angle range in which this effect appears can thus be set.

The representation according to FIG. 3c is based on the so-called grating equation:

$$m\lambda_0 = \Lambda(\sin\theta_{inc} \pm \sin\theta_{diff})$$

Here, m stands for the diffraction order.

Although the various color portions of the incident light are diffracted at different angles, the angle range is not that large. In the case of the example grating period of 770 nm, the difference over the visible spectral range is approx. 15%. As the illumination of the transmissive diffraction structure 52 by the light-emitting element 71 does not occur perfectly at the perpendicular angle of incidence, but diffracts, because of the light cone of the light-emitting element 71 or an arrangement of several light-emitting elements 71, in an angle range around the perpendicular, the transmissive diffraction structure 52 diffracts not only one wavelength at a particular diffraction angle. In the case of a skillfully chosen arrangement of the light-emitting element or elements and of the transmissive diffraction element 52, even the whole visible spectral range is diffracted almost equally strongly in all angle ranges. In this manner, it is possible for example to see the image generated by the one or more light-emitting elements 71 when activated not only in perpendicular observation, but also in the angle range of the first diffraction order. It is further to be taken into account here that light-emitting elements can emit light of a single color or also light in a wide wavelength spectrum, whereby a correspondingly different angle range arises.

Figure 4:
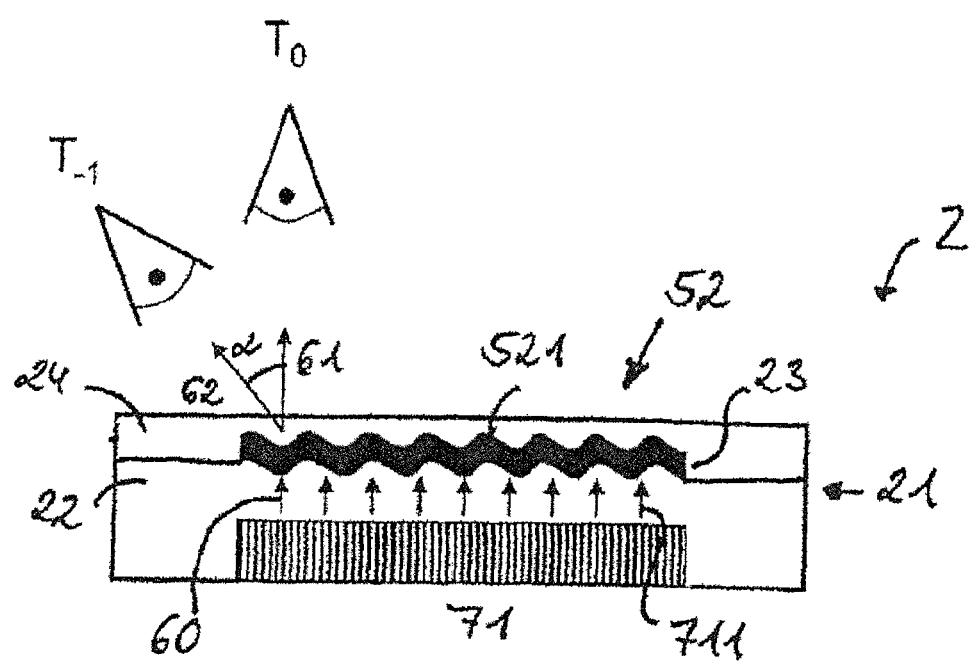
FIG. 4 shows a schematic sectional representation of a security element.

FIG. 4 shows a further embodiment example of the security element 2. The security element 2 consists of a preferably multi-layer substrate 21 which has a transmissive diffraction structure 52 in the area 30. In the area 30 the substrate 21 in the embodiment example according to FIG. 4 has, for this, three transparent layers 22, 23 and 24, wherein a relief structure 521 is molded as transmissive diffraction structure 52 between two of these layers. Further, the security element 2 has one or more light-emitting elements, of which the light-emitting element 71 is shown in FIG. 4, which is arranged under the transmissive diffraction structure 52. The light-emitting element 71 here has a radiation area 711 in which light 60 is radiated in the direction of the top side of the security element 2 when the light-emitting element 71 is activated.

The layers 22 and 24 are preferably transparent polymer layers, for example transparent layers which have a refractive index of approximately 1.5. The layer 23 is a diffraction-intensifying layer. Preferred materials and parameters of the diffraction-intensifying layer are:

Aluminum, copper, silver or chromium, preferably with a layer thickness in the range of from 2 nm to 20 nm, i.e. a thin, transparent metallic layer.

Highly refractive transparent materials (HRI) such as $TiO_2$, $ZnS$, $ZrO_2$, or $Si_3N_4$, preferably with a layer thickness in the range of from 50 nm to 250 nm.

Low-refractive transparent materials (LRI) such as $MgF_2$ or $SiO_2$, preferably with a layer thickness in the range of from 50 nm to 250 nm.

The relief structure 521 has for example a sinusoidal, rectangular, symmetrical or asymmetrical, triangular or even more complex relief shape.

Figure 5:
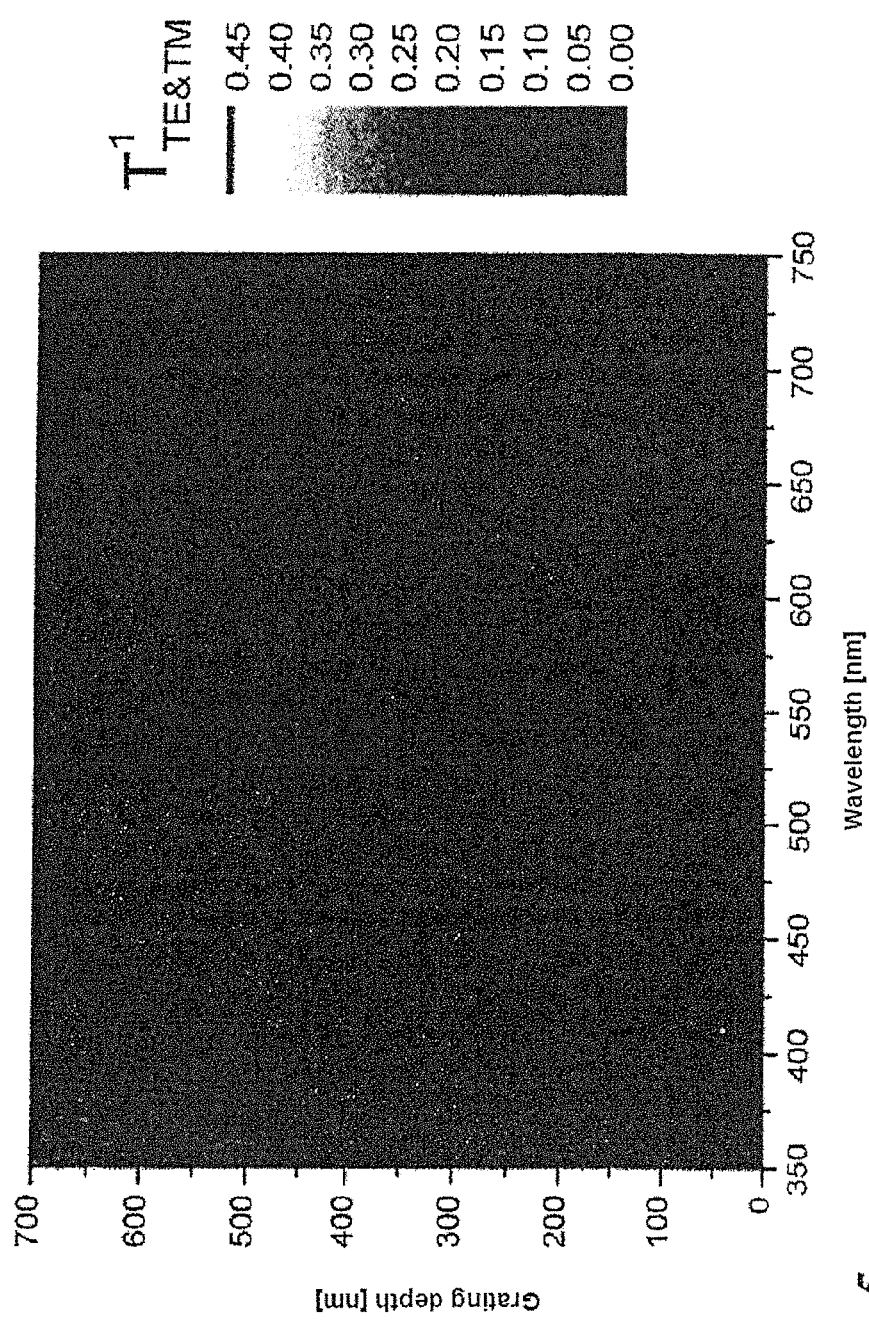
FIG. 5 shows a diagram.

It has been shown here that, to provide a transmissive diffraction structure in the above sense, not only do the relief parameters relief depth and grating period play a role, but also the layer thickness and the material of the diffraction-intensifying layer. FIG. 5 here illustrates the ascertained dependency between diffraction efficiency in the first order ($T_{-1}$) and the relief depth as a function of the wavelength and the relief depth. The grating period in this example is 650 nm and the relief shape is sinusoidal. The diffraction-intensifying layer in this example consists of ZnS embedded in a polymer with a layer thickness of the ZnS layer of 120 nm. Further, the diffraction efficiency averaged over the TE and TM polarization is shown.

Investigations on this basis have shown that, to provide transmissive diffraction structures in the above sense, preferably a grating depth of more than 200 nm and particularly preferably of more than 400 nm is thus to be chosen. At the same time the relief depth is chosen to be smaller than 700 and in particular smaller than 600 nm.

In a relief structure 521 which is optimized for the color green (diffraction peak between 500 nm and 550 nm) the relief depth preferably lies for example in the range between 400 nm and 550 nm.

In order to achieve a significant diffraction that is as spectrally-limited as possible and thus to increase the contrast, it has further proved to be advantageous to use, as diffraction-intensifying layer 23, an HRI layer with a layer thickness between 50 nm and 300 nm, preferably between 75 nm and 150 nm.

Here, spectrally-limited means that outside this range the diffraction is smaller than 10%, still better smaller than 5%.

Direct transmission, i.e. zero-order transmission, is typically over 50% in the visible spectral range over a layer thickness range of the diffraction-intensifying layer 23 of from 0 to 300 nm. It has been shown that the zero-order diffraction efficiency in the layer thickness range of the diffraction-intensifying layer 23 of from 75 nm to 125 nm is particularly uniform. In normal observation an embedded transmissive diffraction structure with a transmission-intensifying layer 23 with this layer thickness thus barely changes the transmission of the light radiated by the one or more light-emitting elements 71 when activated, i.e. the appearance of the information presented by these. The appearance thus appears color-neutral.

Further, investigations have shown that the grating period of the relief structures 521 is preferably to be chosen as follows:

For a color-change effect in the direction of green the grating period is preferably to be chosen to be in the range of from 620 nm to 690 nm, in the direction of red the grating period is to be chosen to be in the range of from 735 to 800 nm and in the direction of blue in the range of from 530 nm to 600 nm.

It is particularly advantageous here to choose the following structure parameters: Color-change effect in the direction of red: grating period=770 nm; layer 23 as ZnS layer with a layer thickness of 120 nm; grating depth=570 nm. Color-change effect in the direction of green: grating period=650 nm; layer 23 as ZnS layer with a layer thickness of 120 nm; grating depth=450 nm. Color-change effect in the direction of blue: grating period=570 nm; layer 23 as ZnS layer with a layer thickness of 120 nm; grating depth=400 nm.

Through the corresponding choice of the relief parameters of the relief structure 521 in the above-described value ranges, a corresponding change in the color of the partial area of the area 30 covered with these structures can thus be achieved when the security element 2 is tilted. Further, through a corresponding combination of relief structures which are optimized for red, green, blue according to the parameters specified above, true-color images can also be realized by means of additive color mixing processes, as explained in even more detail further below.

If light-emitting elements are to be used which radiate a single color, the diffraction grating is preferably optimized to achieve a very high contrast in the range of the observation angle provided.

Figure 6A:
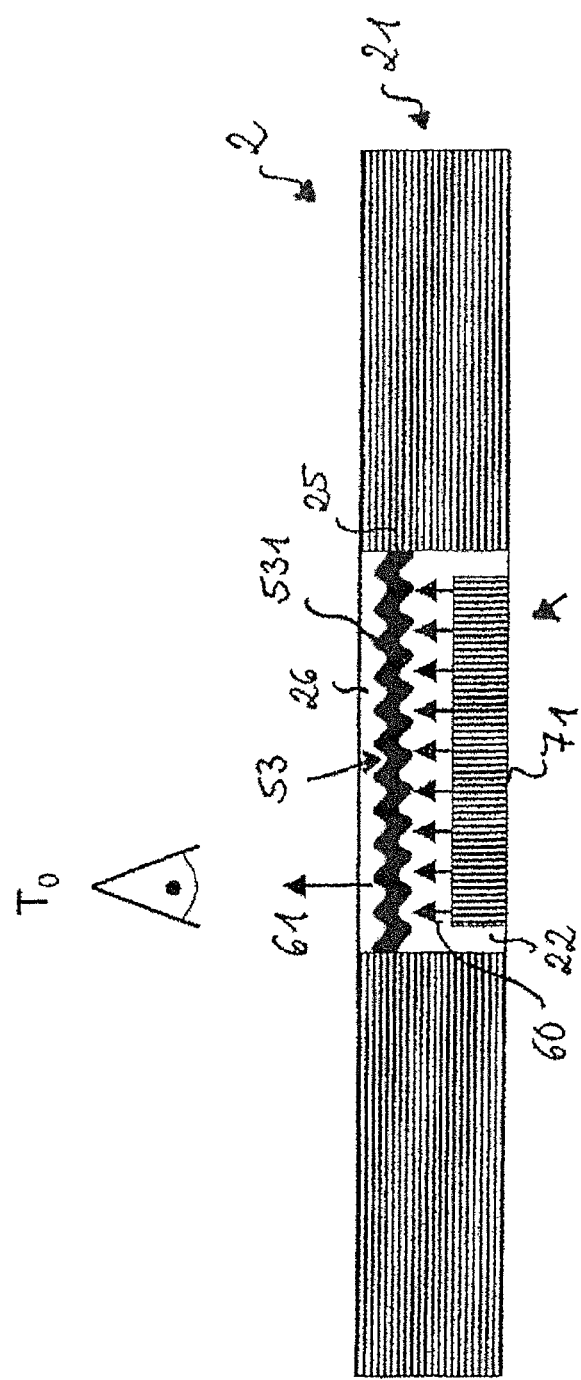
FIGS. 6a and 6b show a schematic sectional representation of a security element in different observation situations.
Figure 6B:
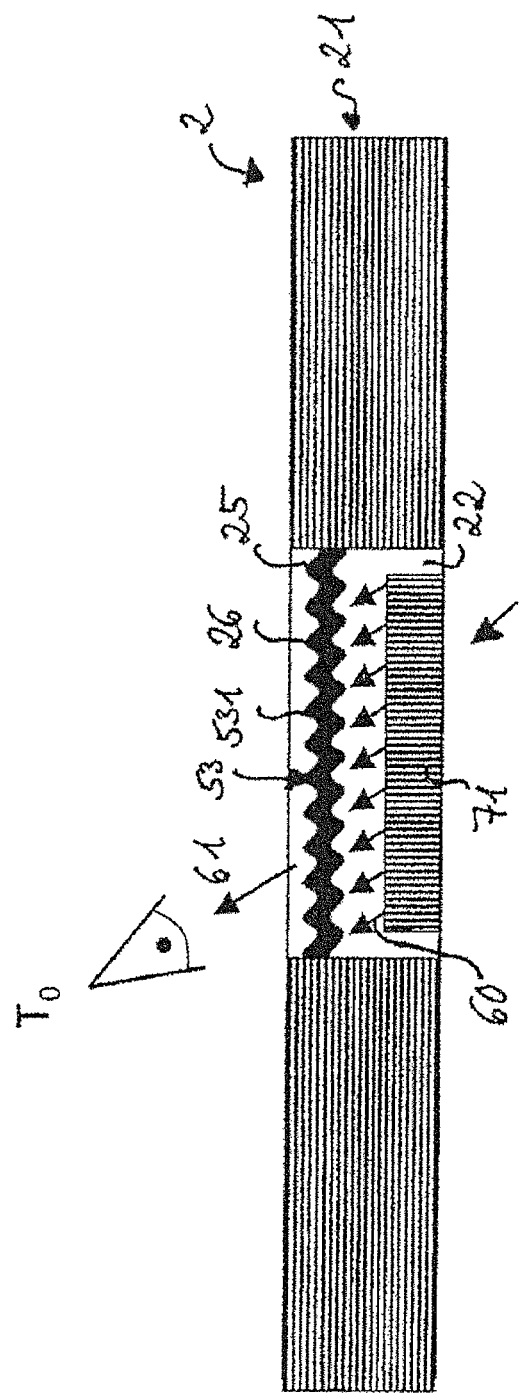

FIG. 6a and FIG. 6b illustrate a further embodiment example of the security element 2.

In the area 30 the substrate 21 has a transmissive diffraction structure 53. For this, in the area 30 the substrate 21 has a transparent layer 22 and a waveguide layer 25, wherein a relief structure 531 is molded between the transparent layer 22 and the waveguide layer 25. In the embodiment example according to FIG. 6a and FIG. 6b the substrate 21 thus has, in the area 30, two transparent polymer layers 22 and 26 and a waveguide layer 25 arranged between these, which is preferably formed of an HRI layer. $TiO_2$, ZnS, $ZrO_2$, or $Si_3N_4$ is preferably used as material for the HRI layer. The layer thickness of the HRI layer is preferably between 50 nm and 250 nm.

The relief structure 531 has a sinusoidal, rectangular, symmetrical, asymmetrical, triangular or even more complex relief shape. The relief structure 531 is a specific zero-order diffraction structure (grating period usually smaller than the target wavelength, which is preferably the wavelength of the light that the assigned light-emitting element radiates). The grating period of the relief structure 531 here is preferably chosen to be between 250 nm and 700 nm, further preferably between 300 nm and 600 nm and in particular preferably between 350 nm and 600 nm.

Further, the security element 2 also has one or more light-emitting elements 71 which, as shown in FIG. 6a and FIG. 6b, are arranged under the transmissive diffraction structure 53. The light radiated when the light-emitting element 71 is activated in a radiation area of the light-emitting element transmits through the transmissive diffraction structures 53 and strikes the eye of the observer as light 61. Here, FIG. 6a illustrates the observation situation when the security element 2 is observed perpendicular to a plane spanned by the back side of the security element 2 and FIG. 6b an observation of the security element 2 tilted relative to this. In the case of tilting, the optical effect described in the following arises, which is based on a shift of the resonance conditions by means of tilting:

Investigations have shown that, to achieve the effect of a transmissive diffraction structure, not only the relief parameters relief depth and grating period, but also the layer thickness of the highly refractive waveguide layer (HRI) have to be chosen correspondingly, in order to achieve the desired effect. The layer thickness of the highly refractive waveguide layer (HRI) is typically in the range of from 50 nm to 250 nm.

Figure 7A:
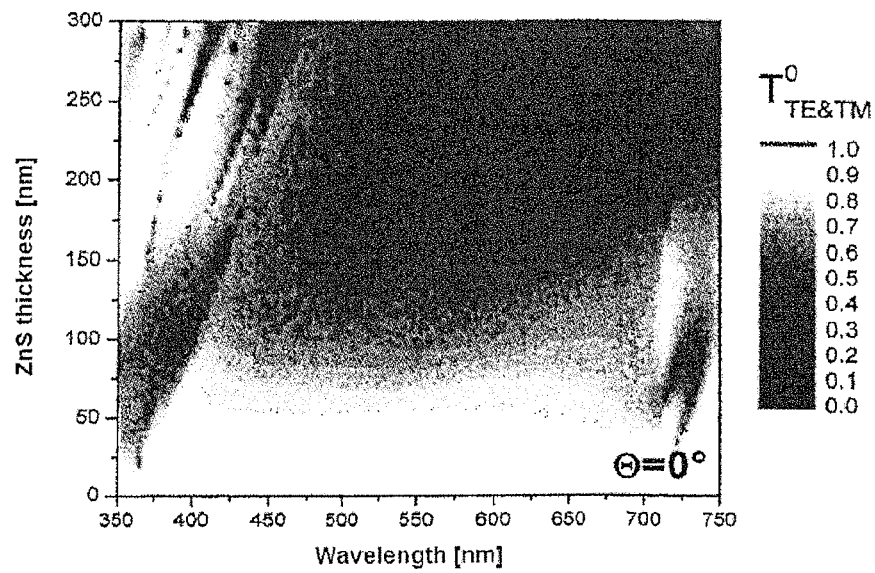
FIG. 7a to FIG. 7e show several diagrams.
Figure 7B:
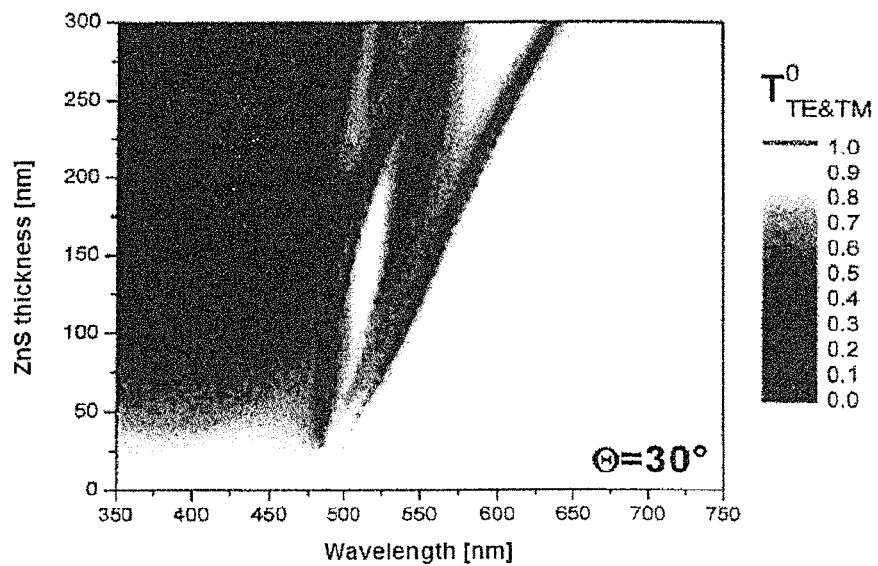

For this, FIG. 7a and FIG. 7b illustrate the dependency of the transmission of the diffraction structure 53 in perpendicular (0°) and, respectively, tilted (30°) illumination or observation in dependence on the wavelength and the layer thickness of the highly refractive waveguide layer, wherein here a relief structure with a sinusoidal relief shape, a grating period of 450 nm and a grating depth of 380 nm is chosen. FIG. 7a here shows the transmission in perpendicular observation and FIG. 7b the transmission in tilted observation. The material for the highly refractive waveguide layer was chosen for example ZnS. For example the above-described contrast effects are hereby brought about, in particular when light-emitting elements are used which radiate light of the same color.

From such investigations it has been revealed that in tilted observation a transmission minimum with T<20% can only be achieved from a thickness of the highly refractive transparent waveguide layer of more than 130 nm. This transmission minimum is essential in order to produce a color impression that is clearly perceptible to the human eye. Further, these investigations have shown that the transmission in perpendicular illumination even up to a thickness of the highly refractive, transparent waveguide layer of 150 nm is clearly over 25%. This makes an appearance that is undistorted in terms of color, i.e. color-neutral, possible in transmission at this angle. The investigations have thus revealed that the thickness of the highly refractive transparent waveguide layer is preferably to be chosen to be in the range of from 130 nm to 250 nm, further preferably in the range of from 150 nm to 220 nm.

Figure 7C:
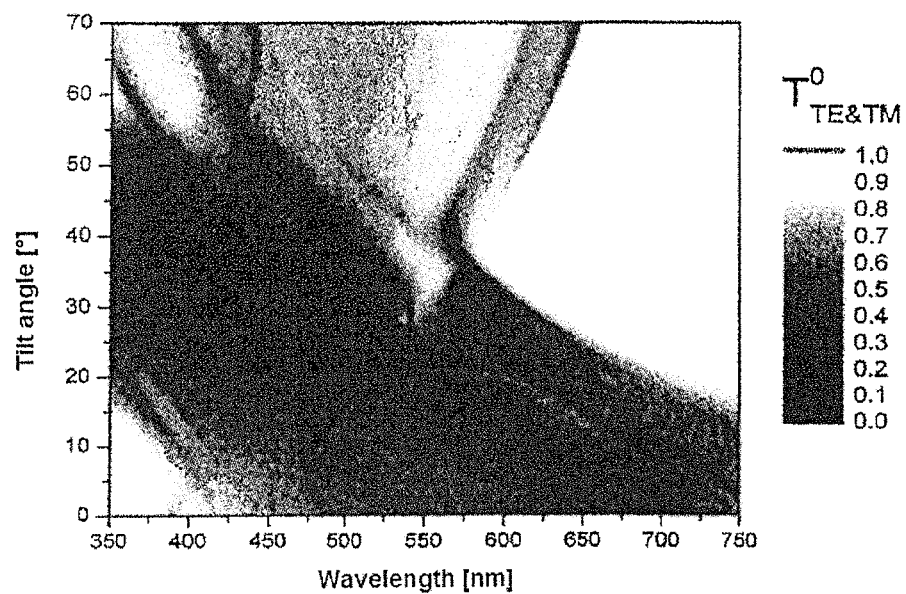
Figure 7D:
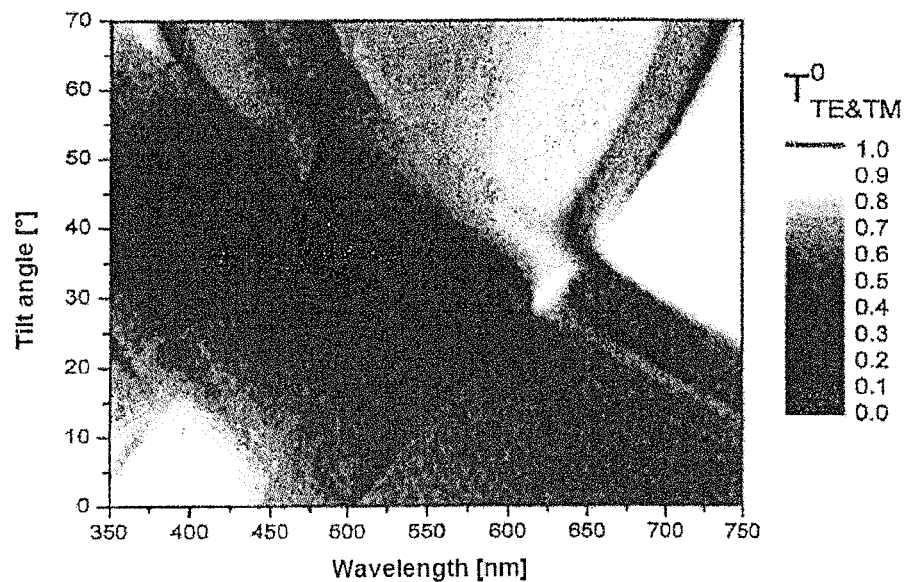
Figure 7E:
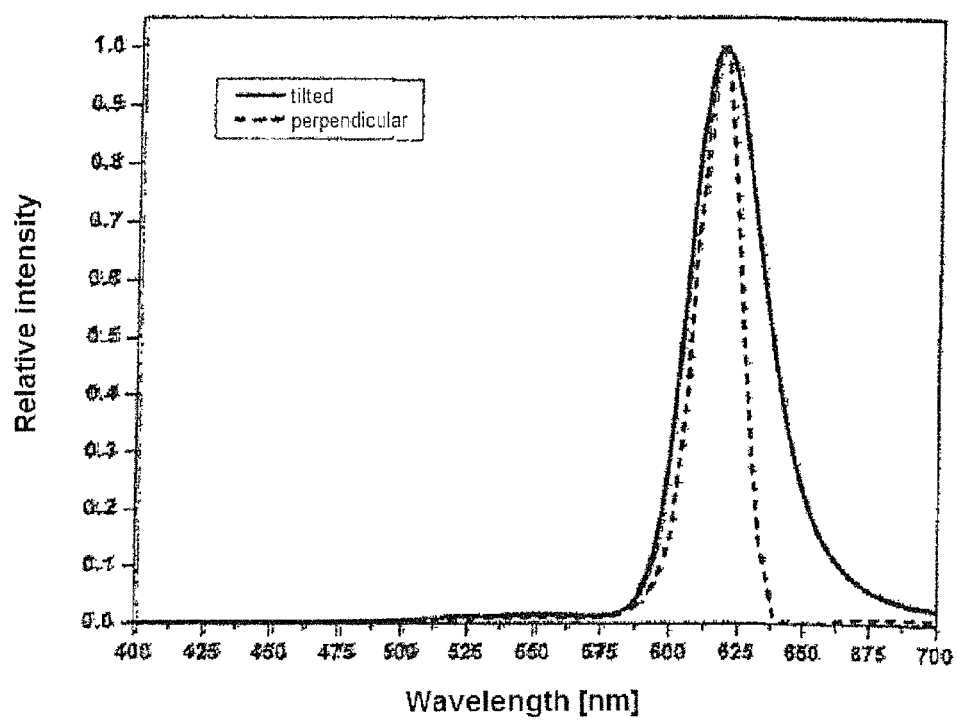

Further, investigations have shown that the spectral behavior of the diffraction grating 53 is also decisively influenced by the grating depth. Thus, FIG. 7c shows the dependency of the transmission of the diffraction grating 53 when the tilt angle is varied with a grating period of 475 nm and a relief depth of 365 nm and FIG. 7d shows this with a grating period of 550 nm and a relief depth of 430 nm, wherein the relief shape is a sine profile and the highly refractive waveguide layer has a layer thickness of 180 nm.

Investigations based on this have shown that in tilted observation a transmission minimum with T<20% is only achievable from a relief depth of over 300 nm, wherein the perpendicular transmission even up to a grating depth of 550 nm lies clearly over 25%. The relief depth of the relief structure 531 is thus preferably chosen to be in the range of from 300 nm to 550 nm, further preferably in the range of from 350 to 500 nm.

With the choice of these parameters, for example a color effect from color neutral in perpendicular observation to colored at a tilt angle of 30° and back to color neutral at a tilt angle of 60° thus arises, for example with the choice of a relief depth of 365 nm, a layer thickness of the transparent waveguide layer of 180 nm and a grating period of 475 nm. Further, for example a color effect from color neutral to light bluish in perpendicular observation to red at a tilt angle of approx. 30° and back to almost color neutral to light reddish at a tilt angle of 60° appears, with the choice of a relief depth of 430 nm, a grating period of 550 nm and a layer thickness of the transparent waveguide layer of 180 nm.

The grating period of the relief structure 531 is preferably chosen to be in the range of from 250 nm to 700 nm, further preferably in the range of from 350 nm to 600 nm. Through the choice of the period, the color appearing when tilted can in particular be set. The period here is preferably chosen to correspond to the wavelength of the assigned light-emitting elements.

Further, investigations have shown that the effects can be achieved not only for linear gratings but also for cross gratings, hexagonal gratings or even more complex grating shapes of the relief structures. Here too, the corresponding choice of the grating depth is, as described above, a decisive factor for achieving the corresponding effects.

The transmissive diffraction structures 51 to 53 illustrated in FIG. 2 to FIG. 7d can also be used to change the spectral radiation characteristics of one or more of the light-emitting elements. For example, the light spectrum of a light-emitting element lighting up red, for example an OLED lighting up red with a maximum peak of the light emission at 620 nm, can be changed by a transmissive diffraction structure designed according to FIG. 7d. When measured at an angle of 30° the longer-wave range above 620 nm is allowed to pass through more strongly than the short-wave range, as illustrated with reference to FIG. 7e, which illustrates an application of a transmissive structure according to FIG. 7d to the radiation characteristics of a light-emitting element with a maximum peak at 620 nm of the radiated light. Although this is only slightly recognizable to the eye, it can be measured well.

Thus, preferably, no information is visible when the light-emitting elements are not activated, and when they are activated the above-described effects appear and in particular an item of information becomes visible.

FIG. 8a to FIG. 9c now illustrate a formation of the security element 2 according to a third class of transmissive diffraction structures.

Figure 8A:
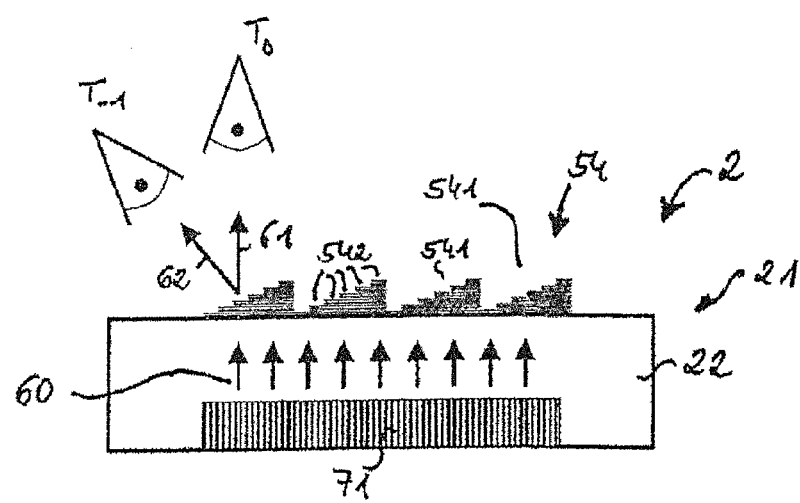
FIG. 8a shows a schematic sectional representation of a security element.
Figure 8B:
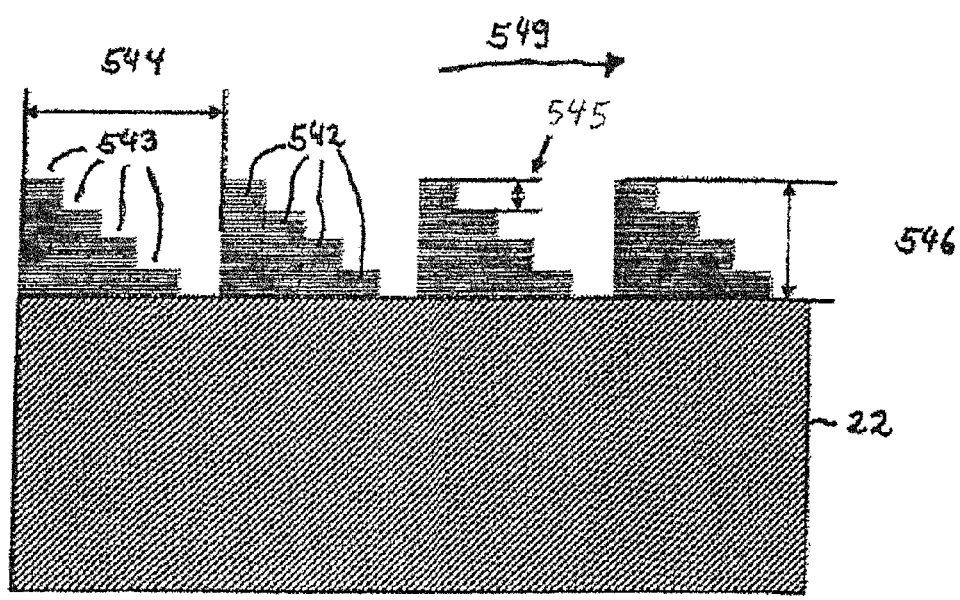

FIG. 8a shows the security element 2 with the substrate 21, which has a transmissive diffraction structure 54 in the area 30. The diffraction structure 54 consists of a plurality of elements 542 which in each case have at least one element surface 543 arranged substantially parallel to a base plane. This is also shown in FIG. 8b, which shows an enlarged representation of a partial area of the area 30. The base plane here is preferably formed of the back side of the substrate 21 or the security element 2. However, it is also possible for the base plane to have an incline relative to the plane spanned by the back side of the substrate and to be tilted slightly relative to this plane.

The elements 542 are arranged offset relative to each other in relation to at least one first direction 549 running parallel to the base plane, and the element surfaces 543 of neighboring elements 542 are spaced apart in a direction perpendicular to the base plane according to a variation function dependent on the at least one first direction 549, by a distance 545 or a multiple of the distance 545. The variation function here is a periodic function and, in each period 544 of the variation function, at least two of the elements following on from each other in the first direction 549 are provided.

In the embodiment example according to FIG. 8a and FIG. 8b the elements 542 here form partial areas of a layer 22 of the substrate 21, namely such that the element surfaces 543 determine the relief structure of at least one partial area of a surface of the layer 22. Thus, to produce the diffraction structure 54, a relief structure 541 is molded into the layer 22, which relief structure is formed such that it has a corresponding sequence of element surfaces 543.

Further, it is also possible for the relief structure 541 to be introduced into a transparent layer applied to the layer 22, for example a transparent replication varnish layer or a transparent HRI or LRI layer, or for the relief structure 541 also to be covered by a porous layer. For this, reference is made to the embodiments in this respect according to FIG. 2.

The period 544 determines the angle for the various diffraction orders. In order that the zero diffraction order is sufficiently spatially separated from the higher diffraction orders, the period 544 is preferably to be chosen to be smaller than 3 μm, in particular smaller than 2 μm. Further, the period should also be chosen to be not smaller than 750 nm, preferably not smaller than 1 μm. The distance 545 is preferably to be chosen to be in the range of from 50 nm to 1500 nm, further preferably between 200 nm and 1000 nm. The number of the elements 542 provided in a period 544 preferably lies in the range of from 3 to 10, particularly preferably between 3 and 6.

As variation function, functions are preferably used which, as shown in FIG. 8a to FIG. 9b, describe a step-shaped, periodic sequence of the element surfaces 543. In addition to the asymmetrical arrangement of the steps within the period 544, as shown in FIGS. 8a and 9a, however, it is also possible for there to be a symmetrical arrangement of the steps for example in the shape of a step pyramid.

Through the diffraction structures 54 and 55, interesting effects can be achieved. The color appearing in transmission at different angles is strongly influenced by the choice of the distance 545 or 555 and the tilt angle at which a change in the properties of the diffraction structures 54 and 55 influencing the color spectrum arises is set by the period 544 or 555. The color impression appearing in perpendicular observation here is strongly determined by the distance 545 or 555.

Through corresponding choice of the distance 545 or 555, not only can the effect be achieved here that the diffraction structures 54 and 55 generate a colored impression in perpendicular observation and the element becomes color-neutral when tilted, but a dark or black appearance can also be achieved. Thus, for example in the formation of the relief structures 54 and 55 shown in FIG. 8a and FIG. 9a, if the total grating depth is chosen to be 1500 nm (distance 554=300 nm) and the period to be 2500 nm, a spectral behavior arises in which the spectral range of from 460 to 660 in transmission in perpendicular observation is smaller than 10% and is moderately transparent (t>30%) at a tilt angle of from 55 degrees to 65 degrees and thus is recognizable in back lighting.

Figure 8C:
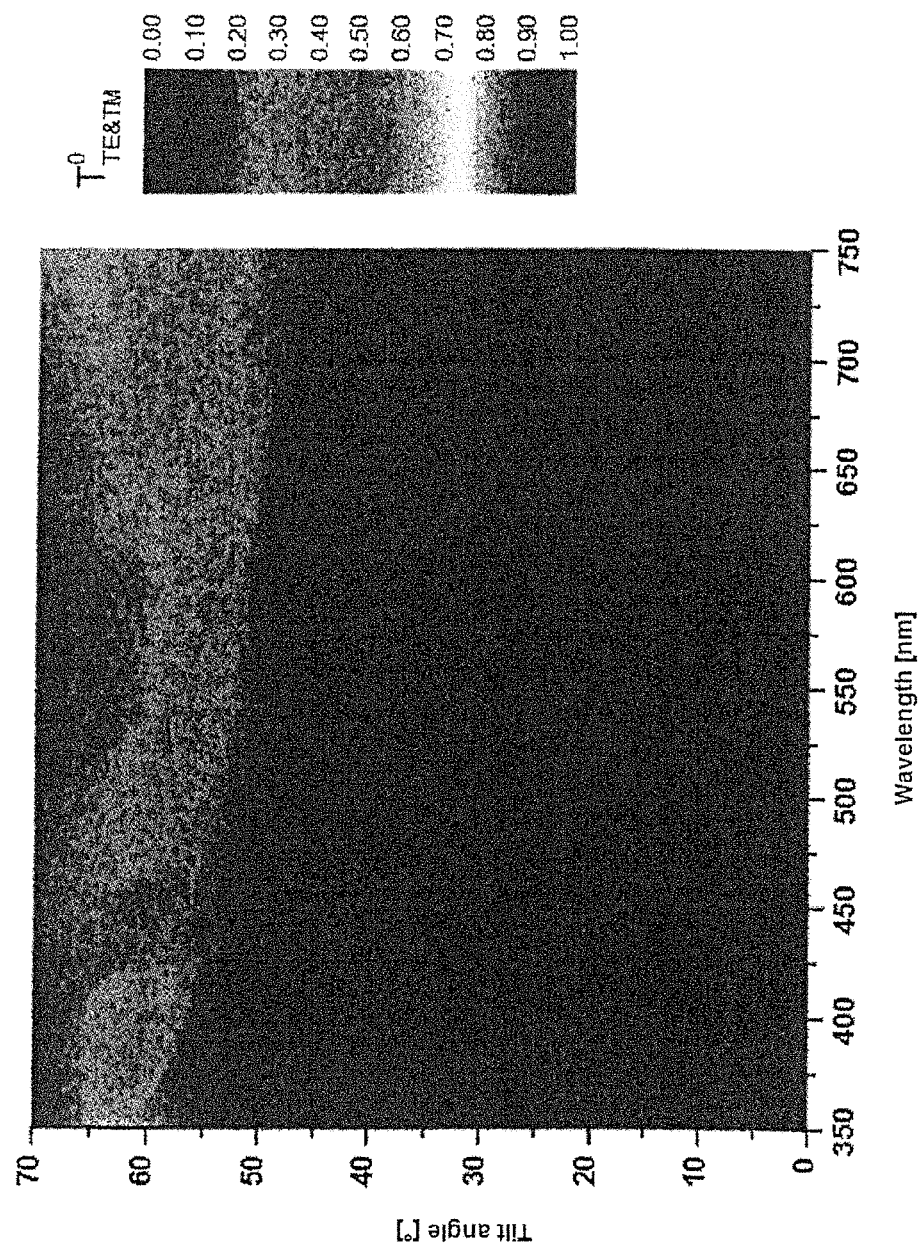
FIG. 8c shows a diagram.

A possible effect which is achieved by the transmissive diffraction structure 54 is a tilt effect from strongly dimmed light-emitting elements to brightly illuminated light-emitting element. FIG. 8c shows, by way of example, the spectral behavior of a transmissive diffraction structure 54, which deflects the light radiated by the light-emitting element 71 in perpendicular observation almost completely into the higher orders. In the spectral range very perceptible to the eye of from 460 nm to 660 nm (sensitivity of the human eye greater than 5%), for this tilt angle, the transmission in the zero diffraction order is smaller than 10%, with the result that the light emitted by the light-emitting element 71 is largely blocked and a dark or black appearance is visible to the observer. FIG. 8c here illustrates the transmission when the tilt angle is varied from 0 to 70°, with a period of 2500 nm, with 5 elements per period and a total relief depth of 1500 nm. At a relatively flat observation or tilt angle of from 55° to 65° the transmissive diffraction structure in this example is moderately transparent (greater than 30%) and thus the light radiated by the light-emitting element is recognizable.

Figure 9A:
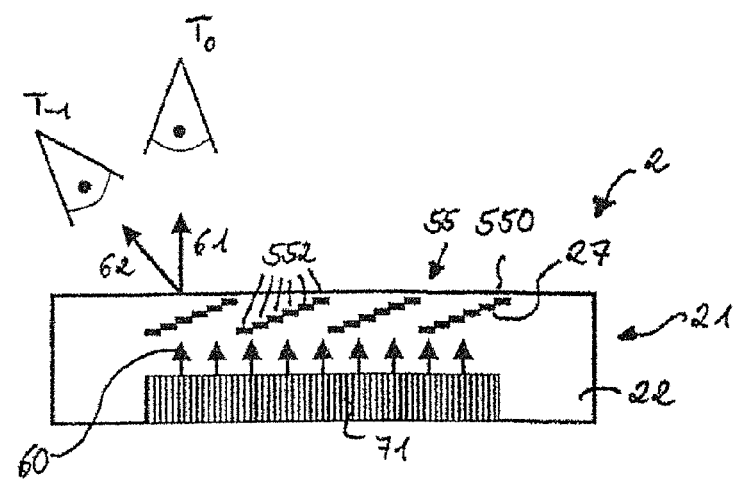
FIG. 9a shows a schematic sectional representation of a security element.
Figure 9B:
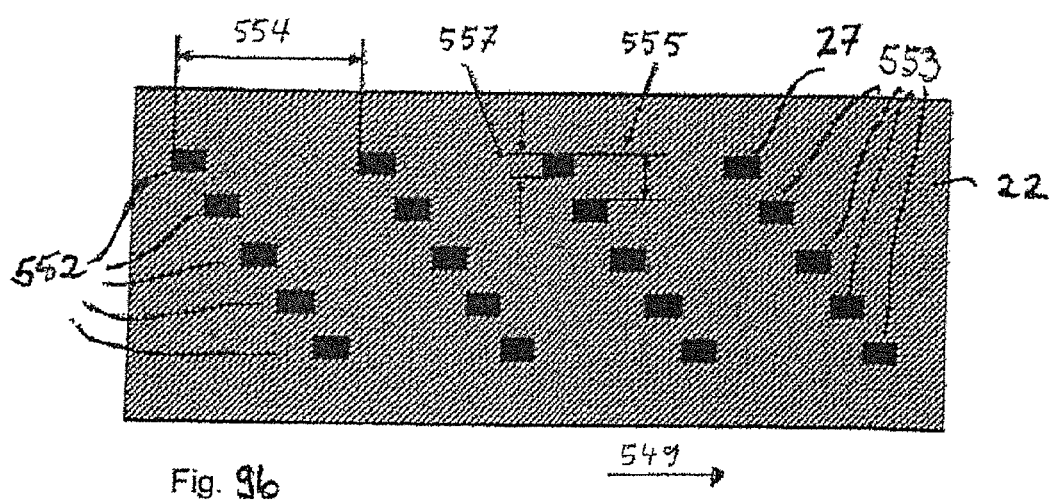

Further, it is also possible for the diffraction structure 54 to be formed of elements which are embedded in a transparent layer of the substrate 21. This embodiment is illustrated in FIG. 9a and FIG. 9b. Reference is made here, in respect of the arrangement and formation of the elements 552, the element surfaces 553, the period 554 and the distance 555, to the statements in this regard concerning the elements 542, the element surfaces 543, the period 544 and the distance 545 according to FIG. 8a to FIG. 8c.

The period 554 here is preferably chosen to be smaller than 3 µm, preferably smaller than 2 µm and furthermore preferably chosen to be not smaller than 750 nm and not smaller than 1 µm.

The distance 555 preferably lies in the range of from 50 nm to 1500 nm, further preferably between 200 nm and 1000 nm.

The number of elements 552 per period is preferably chosen to be between 3 and 10, further preferably between 3 and 6. The maximum relief depth per period here is preferably less than 2 µm.

In the embodiment according to FIG. 9a and FIG. 9b the thickness 557 of the elements 552 is preferably between 10 nm and 600 nm, further preferably between 50 nm and 400 nm. The elements 552 here are preferably formed of a highly refractive layer, i.e. an HRI layer, which can be formed of one of the materials already described for this previously. The layer 22 surrounding the elements 552 preferably consists of a polymeric, transparent plastic material with a refractive index of approximately 1.5.

Figure 9C:
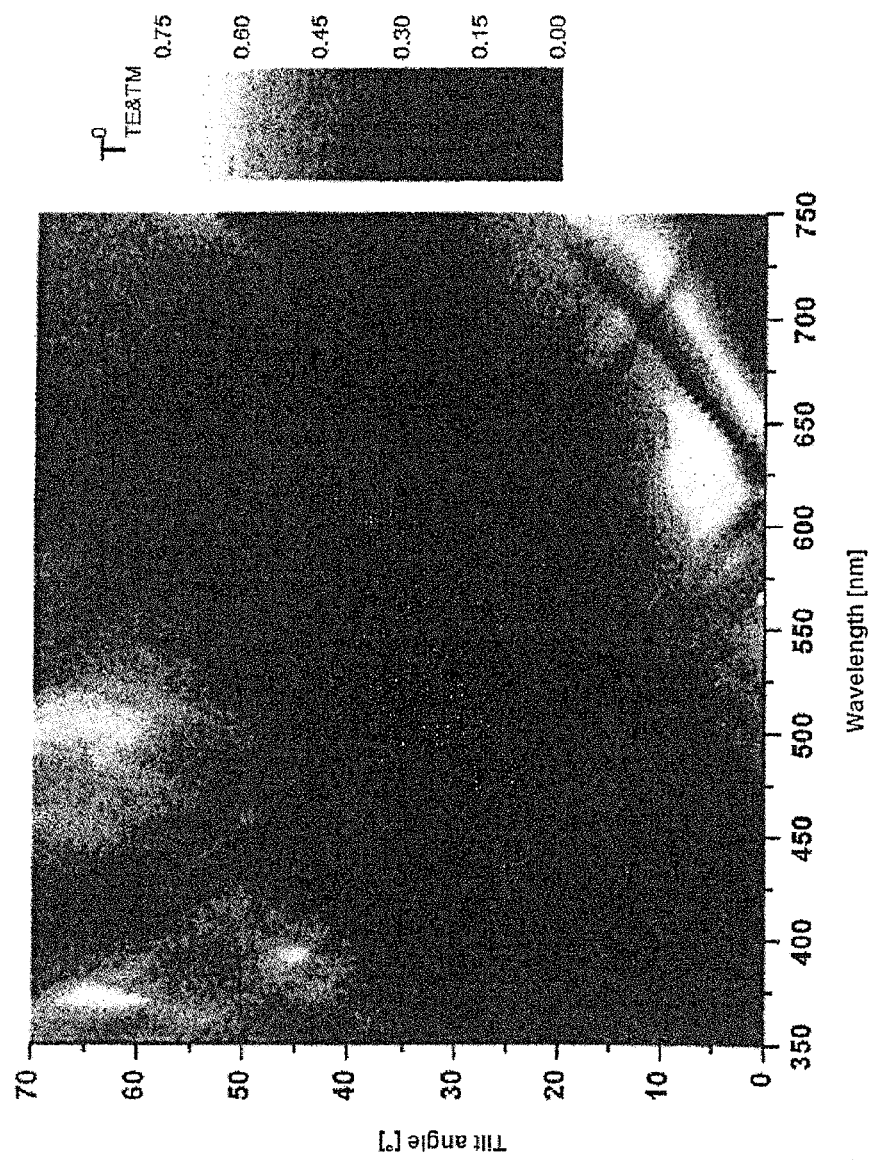
FIG. 9c shows a diagram.

FIG. 9c illustrates, by way of example, the transmission behavior of a transmissive diffraction structure 55 when the tilt angle is varied from 0° to 70°, with a grating period 555 of 1500 nm, the arrangement of 5 elements 552 per period 555, a distance 555 of 430 nm and the elements 552 being formed of an HRI material (ZnS) with a thickness 557 of 300 nm. In perpendicular observation, the light radiated by the light-emitting element 71 is transmitted almost color-neutrally. At the moderate observation angle of 35°, on the other hand, the transmission, in the spectral range very perceptible to the eye of from 460 nm to 660 nm, is largely smaller than 10%. The security element appears dark at this angle of 35°, similarly to the case of so-called "optical firewalls".

Figure 10A:
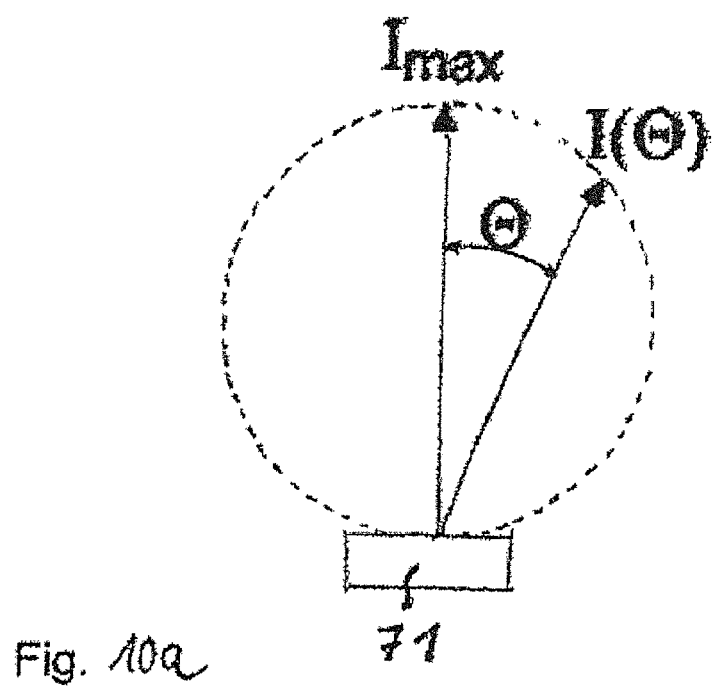
FIG. 10a and FIG. 10b show schematic representations to illustrate the radiation characteristics of a light-emitting element.
Figure 10B:
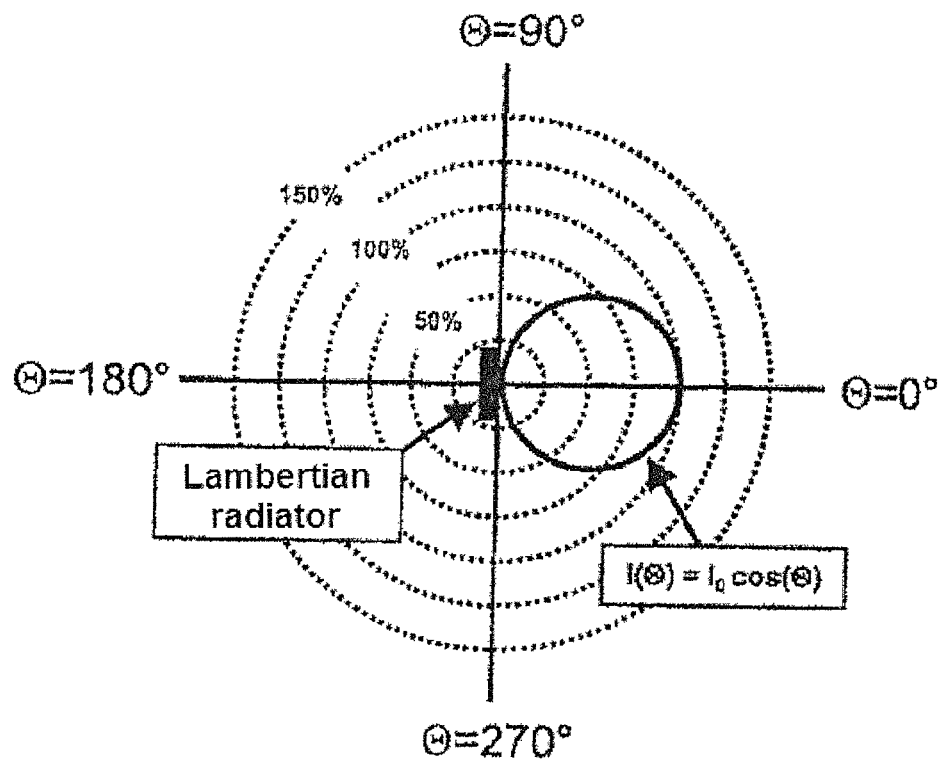

The light-emitting elements 71 are preferably formed of flexible surface-emitting diodes. A special feature of surface-emitting diodes, e.g. organic light-emitting diodes (OLEDs) is their diffuse or not very directional radiation characteristics. In the extreme case, such surface-emitting diodes behave like a so-called Lambertian radiator, as illustrated with reference to FIG. 10a and FIG. 10b. At an angle $\Theta$ relative to the surface normal to the plane spanned by the back side of the security element 2 and with a size A of the radiation area of the surface-emitting diode, the radiation strength $I(\Theta)$ is proportional to $A*\cos(\Theta)$.

According to a preferred embodiment example of the invention one or more of the one or more transmissive diffraction structures arranged in the area 30 are now formed as diffractive beam-forming structures, which in particular also change the radiation characteristics of the light-emitting elements. Corresponding optically variable effects can hereby be generated or also the radiation characteristics of the light-emitting elements, in particular in a formation as surface-emitting diodes as set out above according to FIG. 10a and FIG. 10b, can be optimized.

In particular, volume holograms, blaze structures, diffractive lenses, for example a Fresnel lens structure, or diffractive structures which have lens-like beam-forming properties are used as diffractive beam-forming structures. Further, it is advantageous to arrange one or more of these transmissive diffraction structures next to each other, for example in a two-dimensional grid. Thus, for example, each light-emitting element can be assigned one of the transmissive diffraction structures which modifies the radiation characteristics of the respective light-emitting element. In particular, if the luminous surface is formed pixelated, each of the light-emitting elements can be regarded as a Lambertian radiator. In this case, the radiation characteristics of individual pixels can be modified with a respectively assigned transmissive diffraction structure. The transmissive diffraction structures must be spatially correlated to the display pixels, thus the individual light-emitting elements of the display.

In a preferred embodiment the first area 30 thus has one or more zones which are preferably arranged according to a one- or two-dimensional grid, which for example defines the pixel grid of the display. One of the light-emitting elements 71 is arranged in each of the zones, as well as at least one transmissive diffraction structure assigned to the respective zones.

The diffractive diffraction structures here are preferably formed in the form of simple line gratings. The areas containing these line gratings are distributed, as described in the following, over the areas of the security element covered with the light-emitting elements. Depending on the alignment of the grating lines and the position, different angular distributions of the radiation can thus be realized.

FIG. 11a thus illustrates a zone of a security element formed in this way, with a transmissive diffraction structure 56 and a light-emitting element 71. The transmissive diffraction structure 56 has relief structures 563 and 561 with a plurality of parallel grating lines as well as an area 562 in which no grating lines are provided. As shown in FIG. 11a, the grating lines of the relief structures 563 and 561 are thus provided in the edge areas of the zone, in particular provided in an area of the zone in which the assigned light-emitting element 71 radiates light at an angle unfavorable for the desired optical effect, and not provided in a central area of the zone, in particular not provided in the area in which the assigned light-emitting element 71 radiates light in the desired direction. Such a security element preferably radiates light, for example, perpendicular to the plane of the security element.

FIG. 11b shows the reverse case, in which the diffraction structure has a relief structure 564 with a plurality of parallel grating lines in a central partial area of the zone and in each case no grating lines in the edge area of the zone, and thus an area 562 is provided. Such a security element preferably radiates light, for example, not perpendicular to the plane of the security element.

The light 60 radiated by the light-emitting elements 71 is thus deflected by the transmissive diffraction elements 56 or 57, as shown in FIG. 11a and FIG. 11b, by diffraction, with the result that the light 63 or 64 transmitted through the transmissive diffraction structures 56 or 57 thereby has the beam shape shown in FIG. 11a and FIG. 11b. Through the design of the zones of the security element according to FIG. 11a or FIG. 11b, lens-like effects can thus be generated, wherein the grating parameters, such as grating period, depth, shape and material, are chosen according to the above embodiment examples according to FIG. 2 to FIG. 9.

Figures 12A, 12B, 12C, 12D:
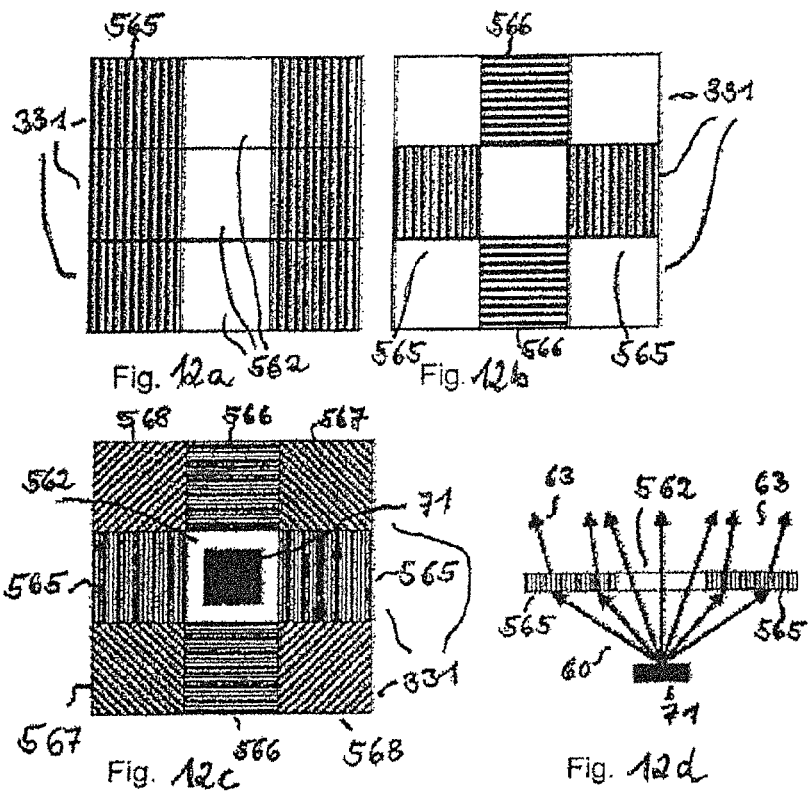
FIG. 12a to FIG. 12c show schematic representations of a top view of a partial area of a security element.
FIG. 12d shows a schematic sectional representation of the partial area of the security element according to FIG. 12c.

Further, it is also possible to choose the alignment of the grating lines in the zones to be different in areas or also to choose them to be different from zone to zone, in order thus to change the radiation characteristics in each plane/direction of view or to change from zone to zone. Through a skillful arrangement of the beam-forming diffraction structures, for example a pattern such as a logo, a currency sign or the like can be produced in the area with the light-emitting element(s), wherein the brightness contrast of the pattern varies with the observation angle. A flip between two or more patterns is also conceivable, for example a flip between a currency sign and a denomination. This is shown by way of example in the following with reference to FIG. 12a to FIG. 12d:

FIG. 12a to FIG. 12c in each case show, by way of example, a top view of a zone which is divided into several partial areas 331, for example is divided into nine partial areas 331. In the embodiment examples according to FIG. 12a the partial areas 331 arranged in the right-hand and left-hand edge area in each case are here covered with a relief structure 565 with parallel grating lines, wherein the parallel grating lines run horizontally, as shown in FIG. 12a. In a striped central area, the partial areas 311 are covered by an area 562 without grating lines. In the embodiment according to FIG. 12b the partial areas 311 lying above and below the central area are further covered with a relief structure 565 in which the grating lines run horizontally. In the embodiment example according to FIG. 12c partial areas 331 are additionally provided in the zone, which partial areas are, as shown in FIG. 12c, covered with relief structures 567 and 568 in which the grating lines run at a 45° angle to the grating lines of the relief structures 565 and 566. The light 60 emitted by the light-emitting element 71 is diffracted by the relief structures 565 to 568 arranged in the partial areas 331, as shown in FIG. 12d by way of example, in each case in a direction perpendicular to the orientation of the grating lines in the direction of the center of the zones, with the result that the embodiments according to FIG. 12a to FIG. 12c in each case result in a corresponding beam formation in which the emitted light is diffracted in one or more spatial directions in the direction of the center of the respective zone, as shown in FIG. 12d for the transmitted light 63.

The relief shape of the structure elements of the relief structures 561, 563 and 565 to 568 here preferably has an asymmetrical shaping, as also shown in FIG. 11a. The structure elements of these relief structures preferably have a triangular shaping, wherein the steeper of the sides in each case here is arranged oriented in the direction towards the center of the respective zone.

Figure 13:
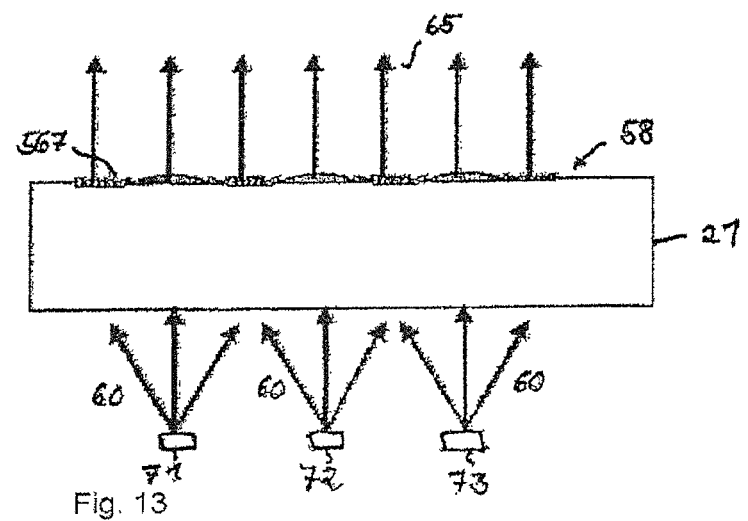
FIG. 13 shows a schematic sectional representation of a partial area of a security element.

Further, it is also possible for one or more of the transmissive diffraction structures arranged in the zones to have relief structures in the form of a diffractive lens, in particular a Fresnel lens or a circular grating. FIG. 13 shows a section of a corresponding security element with the light-emitting elements 71 to 73 and the substrate 21 with a transmissive diffraction structure 58 which consists of a relief structure 567 molded into the surface of the substrate 21 in the form of several Fresnel lenses. The light 60 radiated by the light-emitting elements 71 to 73 is deflected during transmission through the transmissive diffraction structure 68 and transmitted as light 65, as shown in FIG. 13.

Figure 14:
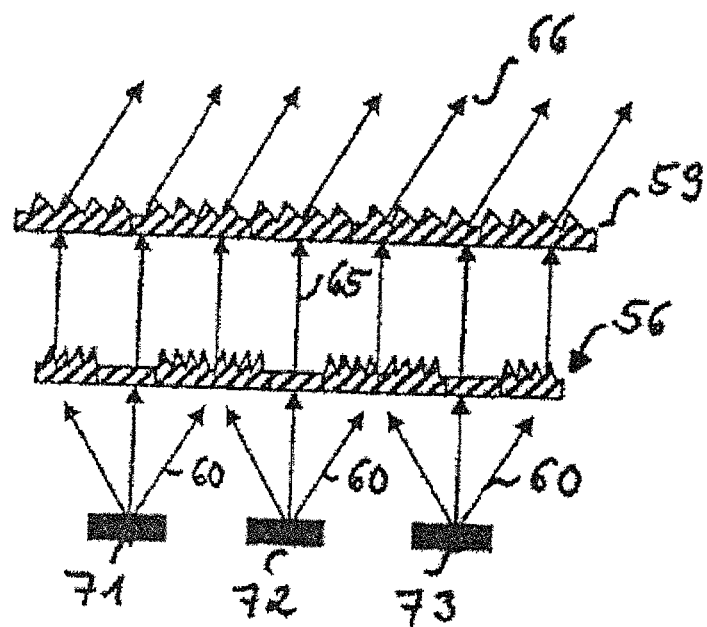
FIG. 14 shows a schematic sectional representation of a partial area of a security element.
Figure 15:
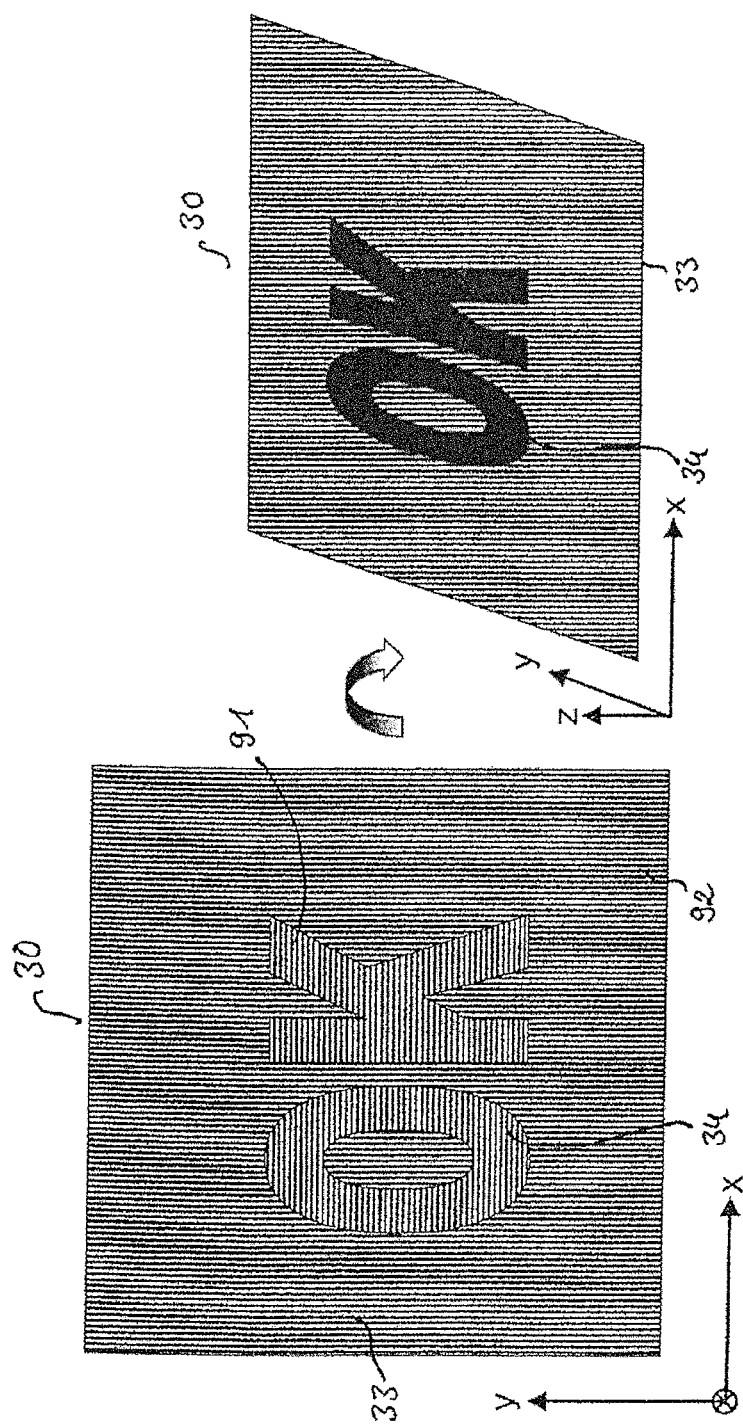
FIG. 15 shows a schematic representation to illustrate the optical appearance arising in an area of a security element in different observation situations.
Figure 16:
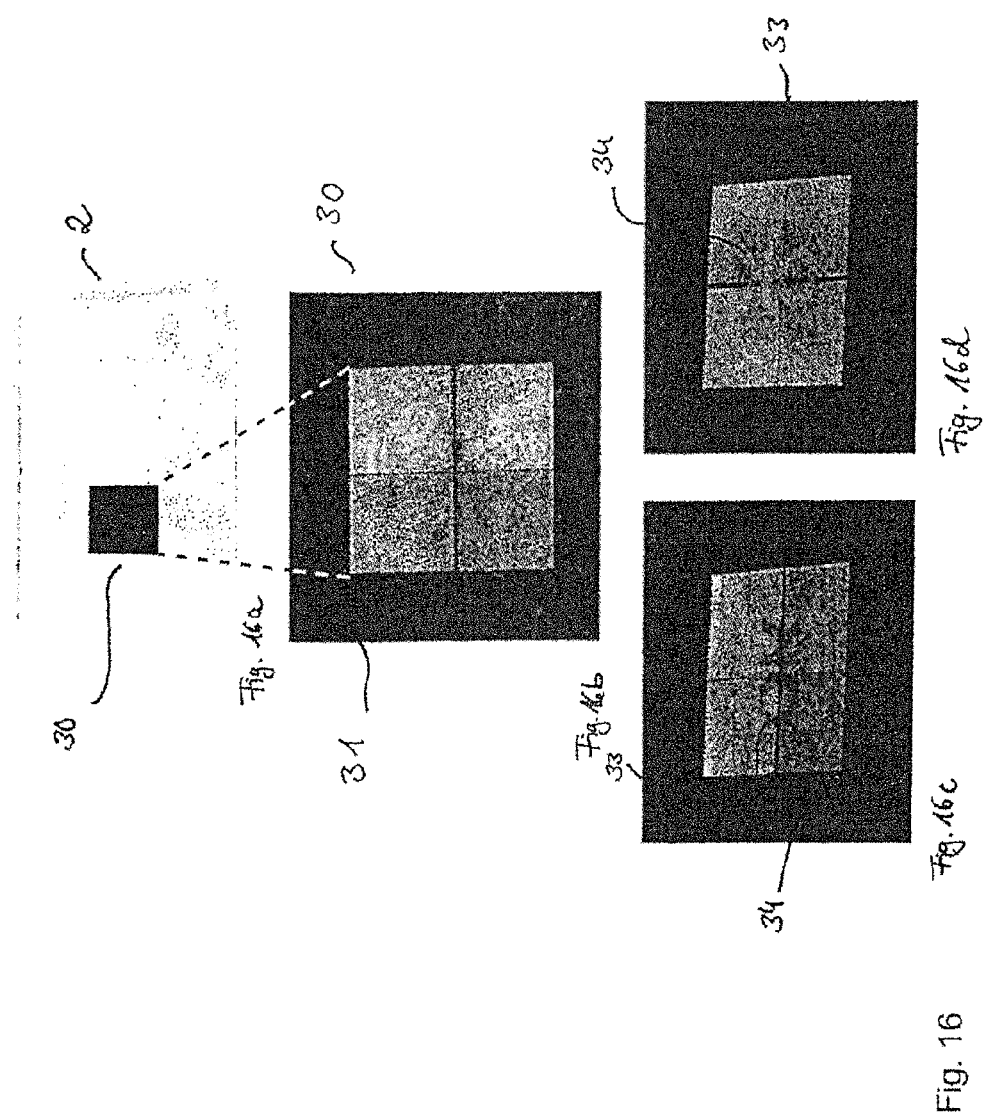
FIG. 16a to FIG. 16d show schematic representations to illustrate the optical appearance of a security element arising in different observation situations.
Figure 17A:
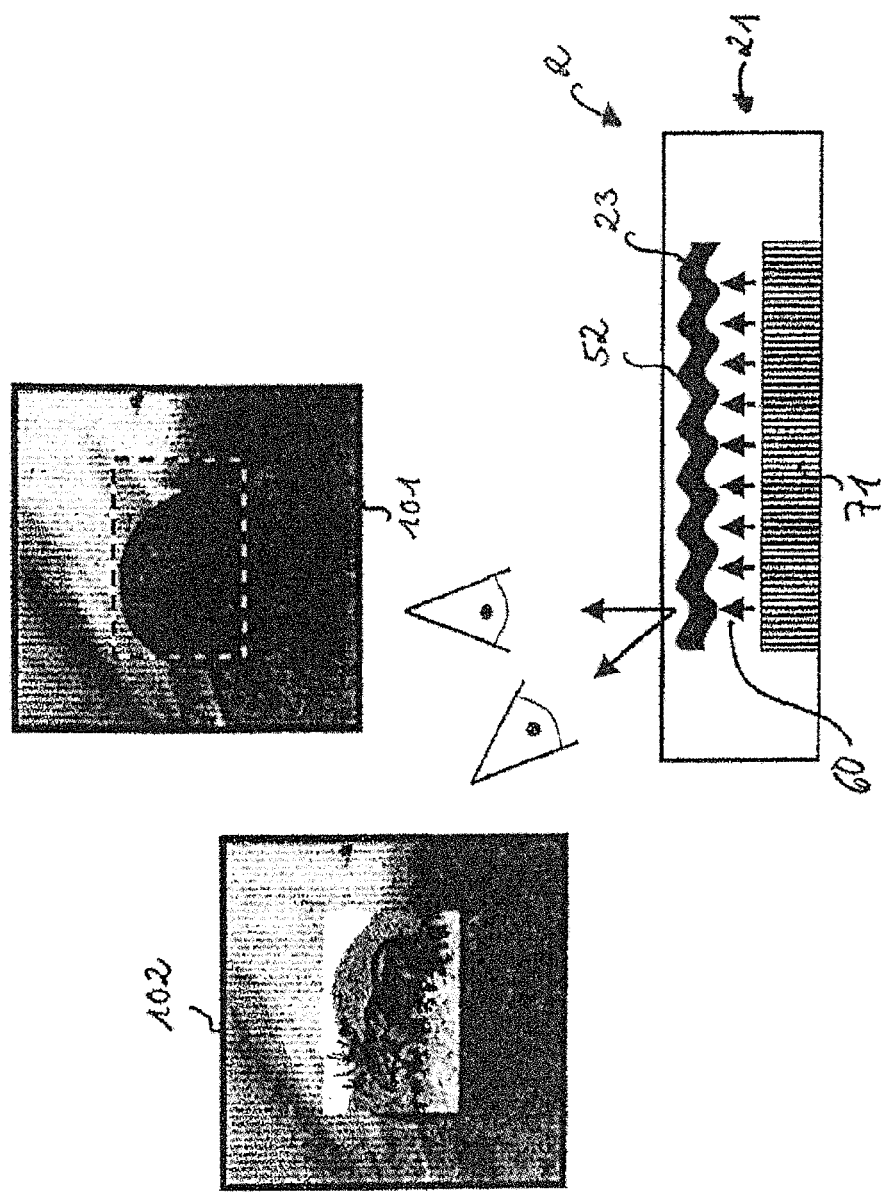

Further, it is also possible for one or more of the transmissive diffraction structures to be arranged in the security element 2 lying one above another. FIG. 14 shows a corresponding structure of such an area of the security element 2 with the light-emitting elements 71 to 73, a transmissive diffraction structure 56 and a transmissive diffraction structure 59.

The transmissive diffraction structure 56 is preferably a transmissive diffraction structure which has beam-forming properties and is designed for example according to FIG. 11a to FIG. 13. Further, a plurality of such transmissive diffraction structures can also be arranged next to each other in the security element 2.

The transmissive diffraction structure 59 is preferably an effect-generating transmissive diffraction structure which is formed for example according to FIG. 2 to FIG. 9c or FIG. 15a to FIG. 19. Further, a plurality of such transmissive diffraction structures can also be arranged next to each other in the security element. The light 60 emitted by the light-emitting elements 71 to 73 is now first deflected during transmission through the transmissive diffraction structure 56 and then strikes the transmissive diffraction structure 59 as light 65 and is in turn deflected correspondingly by this during transmission through this transmissive diffraction structure and radiated as light 66.

The transmissive diffraction structure 56 here is in particular designed so as to change the radiation characteristics of the light-emitting elements 71 to 73 and thus, for example, to bring about a conversion into a parallel beam. The parallel light beam then strikes the transmissive diffraction structure 59 which brings about brightness contrasts and/or color changes of the radiated light when tilted and/or rotated.

The diffractive structure 59 can be provided with further items of information/images which, depending on the tilt or rotation angle, appear to the observer when the light-emitting elements 71 to 73 are activated.

The relief structures of the above-described transmissive diffraction structures are introduced into a master for example by means of electron beam lithography, mask lithography, laser lithography, ion beam lithography or also two-beam interference lithography. The structures can then be produced in large quantities using known methods in a roll-to-roll process. Individual steps for this high production volume are, for example, electroforming embossing tools, step and repeat recombination of the embossing tools to form a roller embossing tool, hot or UV replication, metal or HRI vapor deposition, printing and/or coating.

One effect which can be realized in a security element 2 with the previously described transmissive diffractive diffraction structures combined with the one or more light-emitting elements is a color change which is visible with or without a polarizer. This can occur over the whole surface over the whole area 30, or only partially. For the first case, the whole area which is covered with the one or more light-emitting elements is covered with one or more or the previously described transmissive diffraction structures 31 to 39. For a color change occurring only partially, the transmissive diffraction structures are only partially applied in the area covered with the one or more light-emitting elements. Thus, for example, one or more pattern areas forming one or more motifs are covered, in particular over the whole surface, with one or more of the transmissive diffraction structures, in particular in diffraction structures 51 to 59, further a background area preferably surrounding the one or more pattern areas is not covered with the one or more transmissive diffraction structures, wherein both in the background area and in the pattern area one or more of the one or more light-emitting elements are provided. When tilted, for example, the color change or one of the other effects described here thus occurs only in the pattern area, with the result that the pattern area appears in a contrasting manner in front of the background area.

Further, it is also possible for one or more of the light-emitting elements to radiate polarized light when activated, as already stated above. Further, it is also possible to arrange one or more light-polarizing elements between the light-emitting elements and the transmissive diffraction structures. For one thing, color effects and contrast can be improved hereby. Further security features that are only recognizable by means of an aid (polarizer) can further also be introduced into the security element hereby.

FIG. 15a now shows a further embodiment in which one or more of the transmissive diffraction structures are also provided in the background area.

In the area 30, two or more patterned partial areas are provided which are covered with different transmissive diffraction structures which display optical security features when light-emitting elements are activated.

Zones 33 and 34, which form a common motif, are provided in the area 30, wherein the zone 33 forms the background area and the zone 34 the foreground area of the motif. The zone 33 and the zone 34 here are covered with different transmissive diffraction structures 91 and 92 respectively which are formed like the above-described diffraction structures 51 to 55. The transmissive diffraction structures 91 and 92 here preferably differ in their azimuth angle, are preferably arranged turned relative to each other in relation to their azimuth angle by 45 degrees or 90 degrees. If the parameters of the transmissive diffraction structures 91 and 92 are otherwise chosen to be identical, the zones 33 and 34 display the same optical effect when observed perpendicularly, when the one or more light-emitting elements are activated, with the result that the motif is not visible, because of a lack of contrast between foreground and background area. The motif then becomes recognizable when tilted, when the one or more light-emitting elements are activated.

In the formation as foreground and background area the zones covered with the different diffraction structures are preferably arranged less than 3 µm, preferably less than 1 µm and further preferably less than 500 nm away from each other.

In the embodiment example according to FIG. 15a, by way of example, the zones 34 are thus formed in the form of the letters "OK" and covered with a transmissive diffraction structure with horizontal grating lines and the zone 33 which forms the background for these letters is covered with a transmissive diffraction structure with vertical grating lines. When the security element is tilted, an effect from an appearance of the light emitted by the light-emitting elements that is almost invisible or unchanged in color, or color-neutral, to a color change of this light occurs in the area with the grating lines not vertically aligned, with the result that for example the "OK" emerges as a colored area when tilted. Color-neutral here means that the averaged perpendicular transmission in the very visible spectral range of from 460 nm to 660 nm (sensitivity of the eye >5%) fluctuates by less than +/−15%, preferably by less than +/−10% and particularly preferably by less than +/−5%.

Further, depending on the formation of the one or more light-emitting elements, the following preferred application cases arise: If one or more light-emitting elements are used which radiate light of the same color, striking contrast-change effects arise when tilted. If one or more light-emitting elements are used which radiate white light, strong and striking color-change effects arise. When one or more light elements are used which radiate differently colored light, for example form a true color (RGB) display, striking color effects and contrast effects arise.

The zones 33 and 34 can be covered with one or more of the above-described transmissive diffraction structures. When the transmissive diffraction structures 51 or 52 are used, for example the above-described effect from almost invisible/color-neutral in perpendicular observation as well as the generation of a color impression and/or brightness contrast is brought about when tilted, wherein the color effect is also influenced by the illumination spectrum of the one or more light-emitting elements. A transmissive diffraction structure 51 that can be used here has, for example, a period of 770 nm and a grating depth of 800 nm, and a transmissive diffraction structure 52 that can be used for this has a period of 650 nm, a grating depth of 450 nm and a layer thickness of an embedded ZnS layer of 120 nm. When transmissive diffraction gratings 53 and 54 are used, an effect from invisible or color-neutral to weakly colored in perpendicular observation to colored when tilted appears. Thus, for example, if the relief structure of the transmissive diffraction grating has a period of 550 nm, a grating depth of 430 nm, a layer thickness of the waveguide layer of 180 nm (ZnS), the zone appears color-neutral to light bluish to the observer in perpendicular observation and when white light is emitted by the light-emitting elements. When tilted to approx. 30° the zones 34 become red and when tilted further to 60° the zones 34 appear almost color-neutral to light reddish. With radiation of the colored light by the one or more light-emitting elements this effect is also superimposed by the illumination spectrum of the one or more light-emitting elements.

Such an effect is illustrated by way of example with reference to FIG. 16a to FIG. 16d:

FIG. 16a shows a security element 2 with an area 30. A partial area 31 of the area 30 is covered with one or more light-emitting elements, with the result that the area 31 becomes optically recognizable when the light-emitting elements are activated and optionally displays a single- or multi-colored appearance. FIG. 16a thus shows for example the area 30 in perpendicular observation with light-emitting elements not activated and FIG. 16b shows the area 30 in perpendicular observation with the four light-emitting elements in this example activated. When the security element 2 is tilted by 30° the motif "OK" becomes visible, wherein when the security element 2 is aligned horizontally the zones 34 are changed in color, see FIG. 16c, and when the security element 2 is aligned vertically the zones 33 and thus the background are changed in color, see FIG. 16d.

Further, it is also possible for a plurality of zones with transmissive diffraction structures to be provided in the area 30, which generate for example movement effects, such as morphing or kinematic movements, and/or multi-colored images when the security element 2 is tilted/turned. For example the azimuth angle of neighboring zones can vary here between 0.5° and 10°.

Figure 17A:
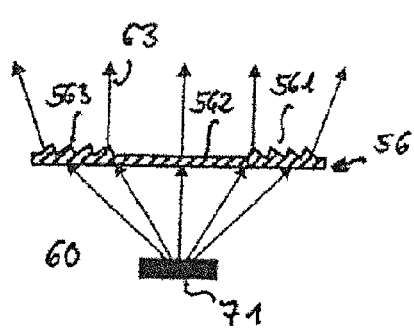
FIG. 17a shows a schematic sectional representation of a security element and a schematic representation of the item of information appearing in different illumination situations.
Figure 17B:
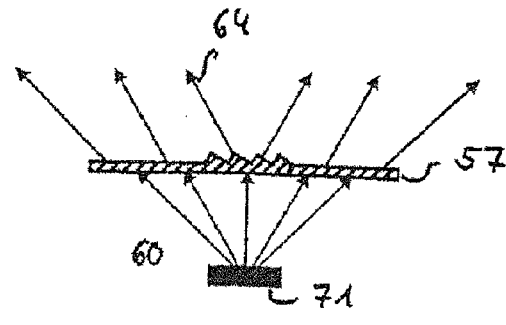

FIG. 17a and FIG. 17b illustrate for example an embodiment example in which a colored representation of a motif is generated at a particular tilt angle range, which colored representation is provided by color mixing of two or more base colors generated by the transmissive diffraction structures.

The security element 2 is, as shown in FIG. 17a, constructed for example according to FIG. 4 and, in perpendicular observation and with light-emitting element 71 activated, displays the appearance 101 which is determined by the formation and arrangement of the light-emitting elements, and when the appearance 102 is tilted.

As indicated in FIG. 17b, in the area 30 of the security element 2 a motif area 35 is provided which is molded here for example in the form of a moose. This motif area 35 is divided into a plurality of image point areas 36. In each of the image point areas 36 the color value and the brightness which this image point area is to have in order to form the motif, namely the moose, are now determined. In the image point areas 36 none or one, two or three different ones of the zones 361, 362 and 363 are now provided depending on these values. The zones 361 here are covered with a transmissive diffraction grating to generate a red color at the determined tilt angle range, the zones 362 are covered with a transmissive diffraction grating different from this in order to produce a green color at the determined tilt angle range and the zones 363 are covered with a transmissive diffraction grating different from this in order to generate a blue color at the determined tilt angle range. The dimension of the image point areas 36 here is chosen such that a color mixing of the different ones of the zones 361 to 363 arranged there in each case is brought about. The image point areas 36 preferably have a lateral dimension of less than 300 µm in at least one direction. The zones 361 to 363 likewise have, in at least one direction, a dimension of less than 300 µm, preferably less than 150 µm, further preferably less than 80 µm. Further, the width and/or length of the zones 361 to 363 is preferably chosen to be greater than 20 µm, 10 µm or 5 µm.

The color value is set to the correspondingly predetermined value by the ratio of the sizes of the surface area of the zones 361 to 363 in the respective image point area 36 and the brightness of the respective image point is set to the correspondingly predetermined value by the total size of the surface area of the zones 361 to 363 in the respective image point area 36.

The diffraction gratings arranged in the zones 361 to 363 are preferably formed like the diffraction grating 52, wherein the following structure parameters for the respective diffraction structure are preferably used here:

Diffraction grating of the zones 361 (red): grating period=770 nm; thickness of the HRI layer=120 nm; grating or relief depth=570 nm.

Diffraction grating of the zones 362 (green): grating period=650 nm; layer thickness of the HRI layer=120 nm; relief depth=450 nm.

Diffraction grating of the zones 363 (blue): grating period=570 nm; thickness of the HRI layer=120 nm; relief depth=400 nm.

The target wavelength of the diffraction gratings here is preferably matched to the light-emitting elements assigned to it.

However, it is also possible for the zones 361 to 363 to be formed according to one of the diffraction gratings 51, 53, 54 or 55, or to be formed of different ones of the diffraction gratings 51 to 55. This is advantageous in particular when for example a different colored appearance of the motif is to be achieved at different tilt angles.

Thus, when the security element 2 is observed perpendicularly and with light-emitting elements activated, the appearance 101 shown in FIG. 17a appears to the observer, in which appearance the transmissive diffraction structures do not change the observation impression, and such that images generated by the one or more light-emitting elements when activated are visible as information. When the security document is tilted, for example according to FIG. 17a, a colored representation of a moose then appears in the area 30 as an item of information.

Figure 18A:
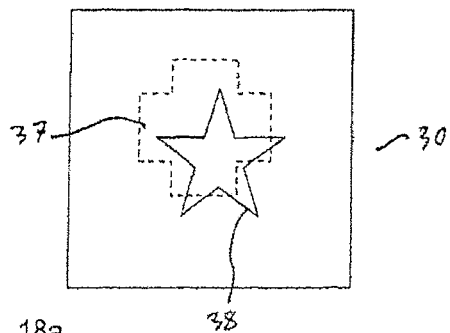
FIG. 18a shows a schematic top view of an area of a security element.
Figure 18B:
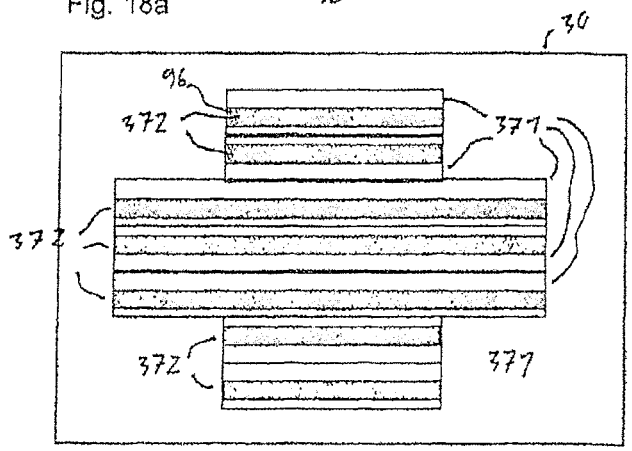
Figure 18C:
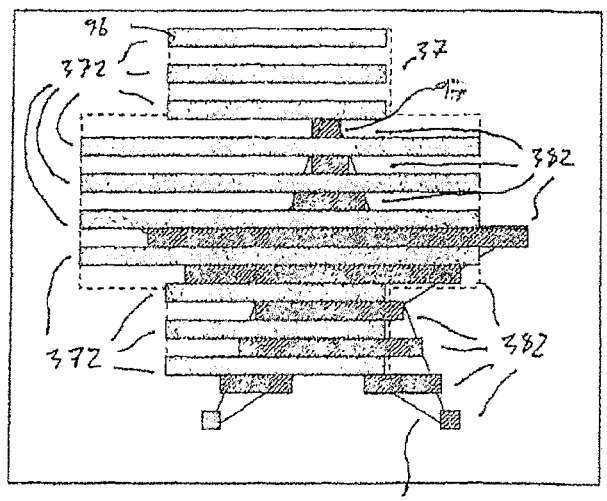

FIG. 18a to FIG. 18c show an embodiment in which, in the area 30 of the security element 2, a plurality of different zones covered with different diffraction structures are provided.

As shown in FIG. 18a, a first motif area 37 molded in the form of a motif, for example a cross, and a second motif area 38 molded in the form of a second motif, for example a star, are provided in the area 30. As shown, not to scale, in FIG. 18b for example with reference to motif area 37, each motif area 37 and 38 is divided into a plurality of partial areas 371 and 381 respectively, which in each case are covered with one or more zones 372 and 382 respectively. The zones 372 and 382 here in each case have at least one lateral dimension of less than 300 µm, preferably less than 150 µm, further preferably less than 80 µm. The zones 372 and 382 here can have a striped shaping, as shown in FIG. 18b and FIG. 18c, or can also have a shaping in the form of pixels, for example a shaping in the form of circular disks or rectangles.

In the overlap area of the motif areas 37 and 38 the zones 372 and 382, as shown in FIG. 14c, are arranged gridded in each other. The zones 372 and 382 are thus preferably arranged according to a preferably regular 1- or 2-dimensional grid, wherein areas for zones 371 and areas for zones 382 are provided alternating. The areas of the grid covered by the respective motif area which are assigned to the zones of this motif area are then covered with the corresponding zones, as also indicated in FIG. 18c.

The zones 372 and 382 in each case are covered with different transmissive diffraction structures which in each case are formed according to one of the diffraction structures 51 to 55. In this respect reference is thus made to the previous statements.

When the security element is tilted, the first motif or the second motif thus becomes visible when light-emitting elements are activated depending on the tilt angle and/or rotation angle. When this functional principle is applied, a plurality of motifs can also be realized in the area 30, which become visible at different tilt and/or rotation angles when the light-emitting elements are activated, whereby movement effects and/or transformation effects can be provided as a further security feature.

Figure 19:
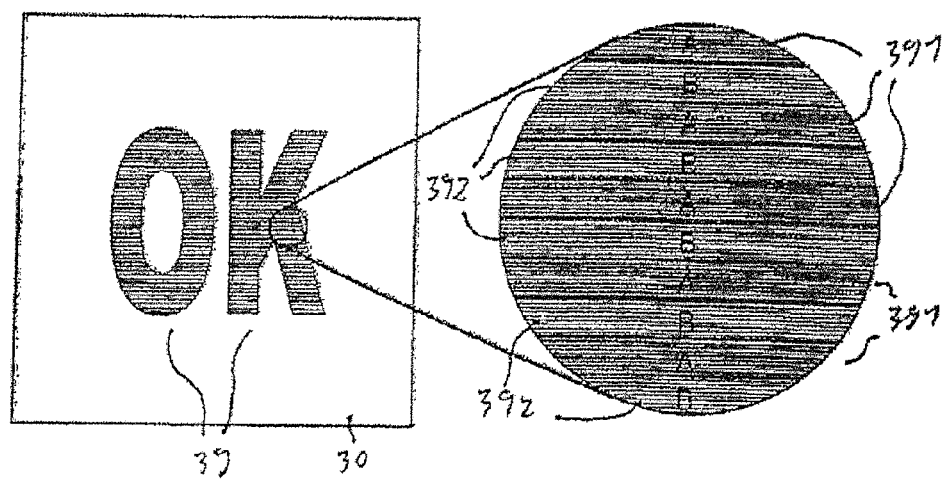
FIG. 19 shows a schematic top view of an area of a security element.

FIG. 19 shows the area 30 of a security element 2 with a motif area 39 molded in the form of the motif "OK". The motif area 39 has a plurality of partial areas 391 and partial areas 392. The partial areas 391 are covered with a transmissive diffraction structure which is formed according to the diffraction structures 51 to 55. The partial areas 392 are covered with a usual reflective diffraction structure. The partial areas 391 and 392 in each case have at least one lateral dimension of less than 300 μm, in particular less than 150 μm, preferably of less than 80 μm. The partial areas 391 and 392 here can be formed, firstly, in the form of stripes, as shown in FIG. 19, but also in the form of pixels. Further, the partial areas 391 and 392, as shown in FIG. 19, are preferably arranged alternately next to each other. In the motif area 39, when the light-emitting elements are activated, an optical security feature is thus generated, as has already been explained for example with reference to the previous figures FIG. 1 to FIG. 18c. When the area 30 is observed in reflected light, a further item of information visible both when the one or more light-emitting elements are activated and when they are deactivated, which is generated by the reflective diffraction structures with which the areas 392 are covered, additionally appears to the observer.

Figure 20:
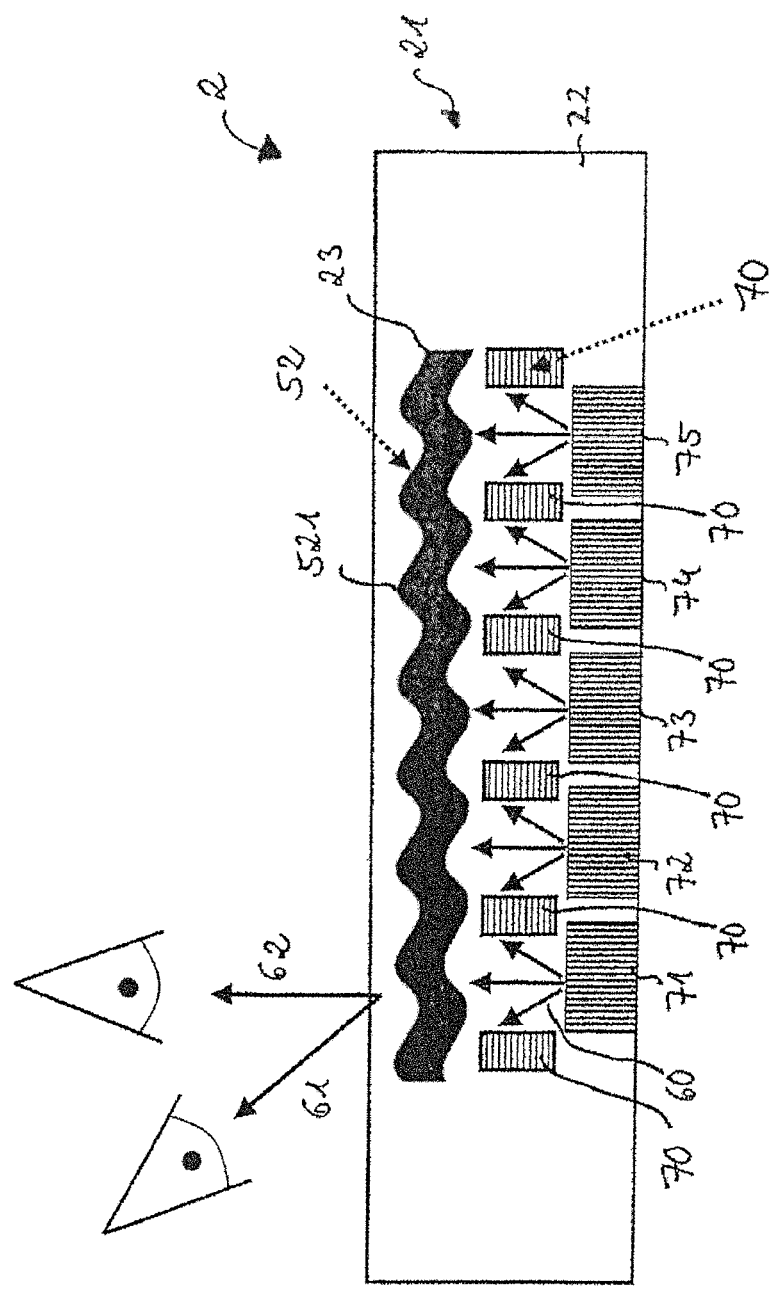
FIG. 20 shows a schematic sectional representation of a security element.

Further, it is also advantageous to provide light-blocking structures in the boundary areas between light-emitting elements. This is shown by way of example in FIG. 20. FIG. 20 shows the security element 2 with a plurality of light-emitting elements 71 to 75 and the substrate 21, which has a transmissive diffraction structure 52. The transmissive diffraction structure 52 is introduced for example into the substrate 21, as shown in FIG. 4, and is thus provided for example by the relief structure 521 which is molded between the transparent layers 22 and 23. However, it is also possible for the transmissive diffraction structure to be another one of the previously illustrated transmissive diffraction structures, for example to be the transmissive diffraction structures 51 or 53 to 59. Further, in the security element light-blocking structures 70 are provided, which preferably are vertically arranged elements preferably formed opaque, which laterally delimit the radiation area of the respective light-emitting element 71 to 75. The light-blocking structures 70 ensure that the light of the light-emitting elements directly reach the eye of the observer only in perpendicular observation. In tilted observation, on the other hand, only the diffracted/bent light reaches the eye of the observer.

The invention claimed is:

1. A security element in the form of a multi-layer flexible film body, with a top side facing an observer and a back side facing away from the observer, wherein the security element has one or more light-emitting elements arranged in a first area of the security element which radiate light when activated and in each case are formed of a self-luminous, electrically operated, display element, wherein the security element has, in the first area, one or more transmissive diffraction structures, wherein the one or more transmissive diffraction structures are arranged such that at least a part of the light radiated by the activated one or more light-emitting elements transmits through at least one partial area of the transmissive diffraction structures, and wherein one or more of the one or more transmissive diffraction structures in each case is formed of a plurality of elements, wherein the elements in each case have at least one element surface arranged substantially parallel to a base plane, the elements are arranged offset relative to each other in relation to at least one first direction running parallel to the base plane and the elements neighboring element surfaces are spaced apart in a direction perpendicular to the base plane according to a variation function dependent on the at least one first direction, by a distance or a multiple of the first distance, wherein the variation function is a periodic function and in each period of the variation function the element surfaces of at least two elements following on from each other in the at least one first direction are spaced apart from each other by the first distance.

2. A security element according to claim 1, wherein the period is smaller than 2 μm, and the period is greater than 1 μm, with the result that each period comprises 3 to 6 successive elements, and/or in that the first distance is between 100 and 300 nm.

3. A security element according to claim 1, wherein the security element has a transparent layer in which the elements are embedded and the elements are formed of a material which differs from the material of the transparent layer, and differs in its refractive index by more than 0.1.

4. A security element according to claim 1, wherein the elements are formed of partial areas of a transparent layer of the security element and the element surfaces form a surface relief molded into the transparent layer.

5. A security element in the form of a multi-layer flexible film body, with a top side facing an observer and a back side facing away from the observer, wherein the security element has one or more light-emitting elements arranged in a first area of the security element which radiate light when activated and in each case are formed of a self-luminous, electrically operated, display element, wherein the security element has, in the first area, one or more transmissive diffraction structures, wherein the one or more transmissive diffraction structures are arranged such that at least a part of the light radiated by the activated one or more light-emitting elements transmits through at least one partial area of the transmissive diffraction structures, and wherein one or more pattern areas forming motifs are covered, over the whole surface, with one or more of the transmissive diffraction structures and a background area surrounding the one or more pattern areas is not covered with the one or more transmissive diffraction structures, wherein both in the background area and in the pattern area one or more of the one or more light-emitting elements are provided.

6. A security element according to claim 5, wherein a first area has one or more first zones which are covered in each case with a first of the transmissive diffraction structures, and has one or more second zones which are covered with a second of the transmissive diffraction structures, wherein the first transmissive diffraction structure differs from the second transmissive diffraction structure.

7. A security element according to claim 6, wherein the first and second transmissive diffraction structures differ from each other in their relief shape, in the azimuth angle and/or their grating period.

8. A security element according to claim 6, wherein the first and the second transmissive diffraction structures are formed of different types of transmissive diffraction structures.

9. A security element according to claim 6, wherein neighboring first and second zones are spaced apart from each other by less than 1 µm.

10. A security element according to claim 6, wherein the first and second zones in each case have a width and a length of, in each case, more than 500 µm.

11. A security element according to claim 10, wherein the one or more first and second zones are molded to form a motif, wherein the first zones form a background area of the motif and the second zones form a foreground area of the motif, or wherein the one or more first zones are molded to form a first motif and the one or more second zones are molded to form a second motif.

12. A security element according to claim 5, wherein the transmissive diffraction structures are designed such that they change the colored appearance, the spectral composition, the brightness contrast, the distribution of the radiation angles and/or the beam formation of one or more of the light-emitting elements when the security element is tilted and/or rotated.

13. A security element according to claim 5 wherein one or more of the transmissive diffraction structures are designed such that the partial areas of the first area covered with them, which are arranged overlapping with one of the light-emitting elements, display a color-change effect recognizable to the human observer as an optical security feature when one or more of the light-emitting elements are activated, when the security element is tilted and/or turned.

14. A security element according to claim 5, wherein one or more of the one or more transmissive diffraction structures in each case are formed of a relief structure molded in a surface of a transparent substrate, wherein the relief structure is molded in particular into the surface of the top side of the security element.

15. A security element according to claim 14, wherein the transparent substrate or one or more transparent layers of the transparent substrate consists of a polymer material and/or of a highly refractive material.

16. A security element according to claim 14, wherein the relief depth of the relief structure is between 900 nm and 1500 nm.

17. A security element according to claim 5, wherein one or more of the one or more transmissive diffraction structures in each case are formed of a relief structure molded between two transparent layers of the security element, wherein the refractive index of these layers differs by at least 0.1.

18. A security element according to claim 17, wherein one of the two transparent layers is a replication varnish layer, and the other of the two transparent layers is a porous layer, wherein the pores of the porous layer are filled with air and the layer thickness of the porous layer is between 2 and 50 µm.

19. A security element according to claim 17, wherein the two transparent layers are two different layers selected from: a polymer layer, a replication varnish layer, an HRI or LRI layer with a layer thickness between 75 and 150 nm, and a metallic layer with a layer thickness in the range of from 2 nm to 20 nm.

20. A security element according to claim 17, wherein the relief depth of the relief structure is more than 400 nm, and/or the relief depth of the relief structure is smaller than 700 nm.

21. A security element according to claim 14, wherein the relief structure is a grating defined by the parameters relief shape, relief depth, grating period and azimuth angle and the grating period is between 600 nm and 1400 nm.

22. A security element according to claim 21, wherein the relief depth of the relief structure is more than 300 nm, and/or the relief depth of the relief structure is smaller than 1200 nm.

23. A security element according to claim 14, wherein the structure elements of the relief structure have an asymmetrical relief shape.

24. A security element according to claim 14, wherein the light transmitted through the relief structure in the zero order in the wavelength range of from 460 nm to 660 nm is largely not changed in its color spectrum and the transmittance of the light transmitted in the zero order and substantially perpendicularly through the transparent substrate is greater than 30%.

25. A security element according to claim 5, wherein at least one of the one or more transmissive diffraction structures is formed of a relief structure comprising a zero-order diffraction grating defined by a relief shape, a relief depth, a grating period and an azimuth angle, wherein the relief depth of the relief structure is between 350 nm and 500 nm, and wherein the grating period is between 350 nm and 600 nm.

26. A security element according to claim 25, wherein the relief structure is molded between a transparent layer and an HRI layer and the thickness of the HRI layer is between 150 nm and 220 nm.

27. A security element according to claim 5, wherein one or more of the one or more transmissive diffraction structures in each case are diffractive beam-forming structures and are formed of a volume hologram, a blaze structure, a diffractive lens or an array of diffractive lenses, a Fresnel lens structure or an array of Fresnel lens structures, or of diffractive structures which have lens-like beam-forming properties.

28. A security element according to claim 27, wherein each light-emitting element is assigned to one of the transmissive diffraction structures which modifies the radiation characteristics of the respective light-emitting element.

29. A security element according to claim 28, wherein the first area has one or more zones which are arranged according to a one- or two-dimensional grid, wherein one of the light-emitting elements is arranged in each of the zones, and at least one of the transmissive diffraction structures is arranged in each of the zones.

30. A security element according to claim 29, wherein one or more of the transmissive diffraction structures arranged in the one or more zones comprises a relief structure with a plurality of grating lines arranged substantially parallel to each other, wherein these grating lines are provided in a central partial area of the respective zone, in a radiation area of the light-emitting element assigned to the zone, and are not provided in an edge area of the zone, in which the assigned light-emitting element does not radiate light, or vice versa.

31. A security element according to claim 30, wherein the orientation of the grating lines is chosen to be different in partial areas of the zones or is chosen to be different from zone to zone.

32. A security element according to claim 29, wherein one or more of the transmissive diffraction structures arranged in the zones are a relief structure in the form of a Fresnel lens or a circular grating.

33. A security element according to claim 5, wherein each light-emitting element has a radiation area in which light is emitted in the direction of the top side of the security element when the light-emitting element is activated.

34. A security element according to claim 33, wherein one or more of the transmissive diffraction structures overlaps the radiation area of one or more of the light-emitting elements over the whole surface or only in areas and in a pattern, when observed perpendicular to a plane spanned by the back side of the security element.

35. A security element according to claim 5, wherein the one or more light-emitting elements are selected from: LED, OLED, LEEC, QLED, backlit LCD, electroluminescent display pixel, segment display, active or passive matrix display.

36. A security element according to claim 5, wherein the security element has a plurality of light-emitting elements, wherein blocking structures are arranged in the boundary area between light-emitting elements.

37. A security element according to claim 5, wherein all the light-emitting elements radiate light of the same color when activated or wherein one or more light-emitting elements radiate red light when activated, one or more of the light-emitting elements radiate green light when activated and/or one or more of the light-emitting elements radiate green light when activated.

38. A security element according to claim 5, wherein the substrate has, in the first area, one or more reflective diffraction structures which display one or more optical security features when observed in reflected light.

39. A security element according to claim 5, wherein the security element is a laminating film or is a transfer layer of a transfer film and has a layer thickness of less than 500 µm.

40. A security element according to claim 5, wherein the security element is a banknote, an ID document or a card.

41. A security element in the form of a multi-layer flexible film body, with a top side facing an observer and a back side facing away from the observer, wherein the security element has one or more light-emitting elements arranged in a first area of the security element which radiate light when activated and in each case are formed of a self-luminous, electrically operated, display element, wherein the security element has, in the first area, one or more transmissive diffraction structures, wherein the one or more transmissive diffraction structures are arranged such that at least a part of the light radiated by the activated one or more light-emitting elements transmits through at least one partial area of the transmissive diffraction structures, and wherein a first area has one or more first zones which are covered in each case with a first of the transmissive diffraction structures, and has one or more second zones which are covered with a second of the transmissive diffraction structures, wherein the first transmissive diffraction structure differs from the second transmissive diffraction structure, and wherein in the first area a plurality of first zones and second zones are provided, and wherein the first and second zones in each case have at least one lateral dimension of less than 150 µm.

42. A security element according to claim 41, wherein, in the first area a plurality of third zones which are covered with a third one of the transmissive diffraction structures and/or fourth zones which are covered with a fourth one of the transmissive diffraction structures are provided, wherein the first, second, third and fourth transmissive diffraction structures in each case mutually differ from each other and the third and fourth zones respectively in each case have at least one lateral dimension of less than 150 µm.

43. A security element according to claim 41, wherein the first area has a motif area which is divided into a plurality of image point areas, and wherein in at least a first of the image point areas at least two different zones selected from the group first and second zones, the group first, second and third zones or the group first, second, third and fourth zones are arranged, and wherein the color appearing in the first image point area when one or more of the light-emitting elements are activated at least at one tilt angle is generated by additive color mixing of the colors generated at this tilt angle by the transmissive diffraction structures arranged in this image point area in the different zones.

44. A security element according to claim 43, wherein at least 10% of the image point areas are formed as first image point areas.

45. A security element in the form of a multi-layer flexible film body, with a top side facing an observer and a back side facing away from the observer, wherein the security element has one or more light-emitting elements arranged in a first area of the security element which radiate light when activated and in each case are formed of a self-luminous, electrically operated, display element, wherein the security element has, in the first area, one or more transmissive diffraction structures, wherein the one or more transmissive diffraction structures are arranged such that at least a part of the light radiated by the activated one or more light-emitting elements transmits through at least one partial area of the transmissive diffraction structures, and wherein a first area has one or more first zones which are covered in each case with a first of the transmissive diffraction structures, and has one or more second zones which are covered with a second of the transmissive diffraction structures, wherein the first transmissive diffraction structure differs from the second transmissive diffraction structure, and wherein neighboring first and second zones are spaced apart from each other by less than 1 µm, and wherein a first motif area molded in the form of a first motif and a second motif area molded in the form of a second motif are provided in the first area, wherein the first motif area is divided into a plurality of partial areas which in each case are covered with one or more first zones, and the second motif area is divided into a plurality of partial areas which in each case are covered with one or more second zones, wherein the first motif area and the second motif area are provided overlapping at least in areas and first and second zones are provided next to each other in the overlap area.

46. A security element according to claim 45, wherein the first and second zones are arranged according to a one- or two-dimensional grid and the first and second zones are gridded in each other in the overlap area.

47. A security element according to claim 42, wherein the first, second, third and/or fourth zones in each case overlap with one or more of the light-emitting elements or with a radiation area of one or more of the light-emitting elements, relative to a direction perpendicular to a plane spanned by the back side of the security element.

48. A security element according to claim 42, wherein one or more fifth ones of the transmissive diffraction structures and one or more sixth ones of the transmissive diffraction structures are arranged lying one above another, in relation to a direction perpendicular to the plane spanned by the back side of the security element.

49. A security element according to claim 48, wherein the fifth diffraction structures are beam-forming diffraction structures, and the sixth diffraction structures are effect-generating diffraction structures.

50. A security element in the form of a multi-layer flexible film body, with a top side facing an observer and a back side facing away from the observer, wherein the security element has one or more light-emitting elements arranged in a first area of the security element which radiate light when activated and in each case are formed of a self-luminous, electrically operated, display element, wherein the security element has, in the first area, one or more transmissive diffraction structures, wherein the one or more transmissive diffraction structures are arranged such that at least a part of the light radiated by the activated one or more light-emitting elements transmits through at least one partial area of the transmissive diffraction structures, and
   wherein a first item of optical information, that becomes visible, moves or changes its shape or color when tilted or when turned is provided by the one or more transmissive diffraction structures, wherein the radiation area of one or more of the light-emitting elements has a patterned shaping and is molded in the form of a motif visible as second item of optical information when the light-emitting element is activated and/or wherein two or more of the light-emitting elements are arranged or controllable such that, when they are activated, a motif becomes visible as second item of optical information, and wherein the first item of optical information and the second item of optical information overlap in areas or completely or are arranged next to each other, relative to a direction perpendicular to a plane spanned by the back side of the security element.

51. A security element in the form of a multi-layer flexible film body, with a top side facing an observer and a back side facing away from the observer, wherein the security element has one or more light-emitting elements arranged in a first area of the security element which radiate light when activated and in each case are formed of a self-luminous, electrically operated, display element, wherein the security element has, in the first area, one or more transmissive diffraction structures, wherein the one or more transmissive diffraction structures are arranged such that at least a part of the light radiated by the activated one or more light-emitting elements transmits through at least one partial area of the transmissive diffraction structures, and
   wherein, in the first area, a plurality of first partial areas are provided which are covered with one of the one or more transmissive diffraction structures, and a plurality of second partial areas are provided which are covered with one of the one or more reflective diffraction structures, wherein the first and second partial areas in each case have at least one lateral dimension of less than 150 μm, and wherein, at least in areas, first and second partial areas are arranged next to each other, with the result that in the first area a first item of optically variable information determined by the first partial areas appears in reflected light when one or more of the light-emitting elements are activated and a second item of optically variable information determined by the second partial areas appears overlapping this at least in areas in the first area in reflected light.

* * * * *